United States Patent
Watanabe et al.

(10) Patent No.: US 6,169,866 B1
(45) Date of Patent: *Jan. 2, 2001

(54) PROCESS CARTRIDGE AND ELECTROPHOTOGRAPHIC IMAGE FORMING APPARATUS

(75) Inventors: Kazushi Watanabe, Mishima; Isao Ikemoto, Kawasaki; Atsushi Numagami, Mishima; Katsunori Yokoyama, Susono, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/939,012

(22) Filed: Sep. 26, 1997

(30) Foreign Application Priority Data

Sep. 26, 1996 (JP) .................................... 8-277524
Sep. 26, 1996 (JP) .................................... 8-277525
Sep. 25, 1997 (JP) .................................... 9-279618

(51) Int. Cl.[7] .................................................. G03G 15/00
(52) U.S. Cl. ........................................ 399/111; 399/167
(58) Field of Search ........................... 399/75, 111, 110, 399/167, 88, 90, 116

(56) References Cited

U.S. PATENT DOCUMENTS

| | | | |
|---|---|---|---|
| 4,829,335 | 5/1989 | Kanemitsu et al. | 399/111 |
| 4,975,743 | 12/1990 | Surti | 399/111 |
| 5,023,660 | 6/1991 | Ebata et al. | 399/111 |
| 5,404,198 | 4/1995 | Noda et al. | 399/107 |
| 5,488,459 | 1/1996 | Tsuda et al. | 399/167 |
| 5,543,898 | 8/1996 | Shishido et al. | 399/111 |
| 5,602,623 | 2/1997 | Nishibata et al. | 399/111 |
| 5,608,509 | 3/1997 | Shirai et al. | 399/351 |
| 5,659,847 | 8/1997 | Tsuda et al. | 399/113 |
| 5,903,803 | * 5/1999 | Kawai et al. | 399/111 X |
| 6,016,413 | * 1/2000 | Yokoyama et al. | 399/111 X |
| 6,035,159 | * 3/2000 | Azuma et al. | 399/111 |

FOREIGN PATENT DOCUMENTS

| | | |
|---|---|---|
| 0 520 802 A2 | 12/1992 | (EP) . |
| 0 679 963 A2 | 11/1995 | (EP) . |
| 0 735 432 A1 | * 10/1996 | (EP) . |
| 0 797 125 A1 | 9/1997 | (EP) . |
| 8-270642 | * 10/1996 | (JP) . |
| 8-328449 | * 12/1996 | (JP) . |

* cited by examiner

*Primary Examiner*—Sophia S. Chen
(74) *Attorney, Agent, or Firm*—Fitzpatrick, Cella, Harper & Scinto

(57) ABSTRACT

A process cartridge detachably mountable to a main assembly of an electrophotographic image forming apparatus, wherein the main assembly includes a motor, a main assembly side gear for receiving driving force from the motor, a main assembly positioning member, a hole which is substantially coaxial with the gear, and a process cartridge mounting portion for mounting the process cartridge, the process cartridge includes an electrophotographic photosensitive drum; process mechanism(s) actable on the photosensitive drum; and a projection engageable with the hole, the projection being provided at a longitudinal end of the photosensitive drum; wherein when the main assembly side gear rotates with the hole and projection engaged with each other, the rotational driving force is transmitted from the gear to the photosensitive drum through engagement between the hole and the projection; a cartridge positioning portion for abutting to the main assembly positioning portion to stop a movement of the process cartridge beyond a predetermined distance in a direction substantially perpendicular to an axis of the photosensitive drum, when the process cartridge is mounted to the cartridge mounting portion, and the photosensitive drum receives the rotation driving force through the hole and the projection.

54 Claims, 26 Drawing Sheets

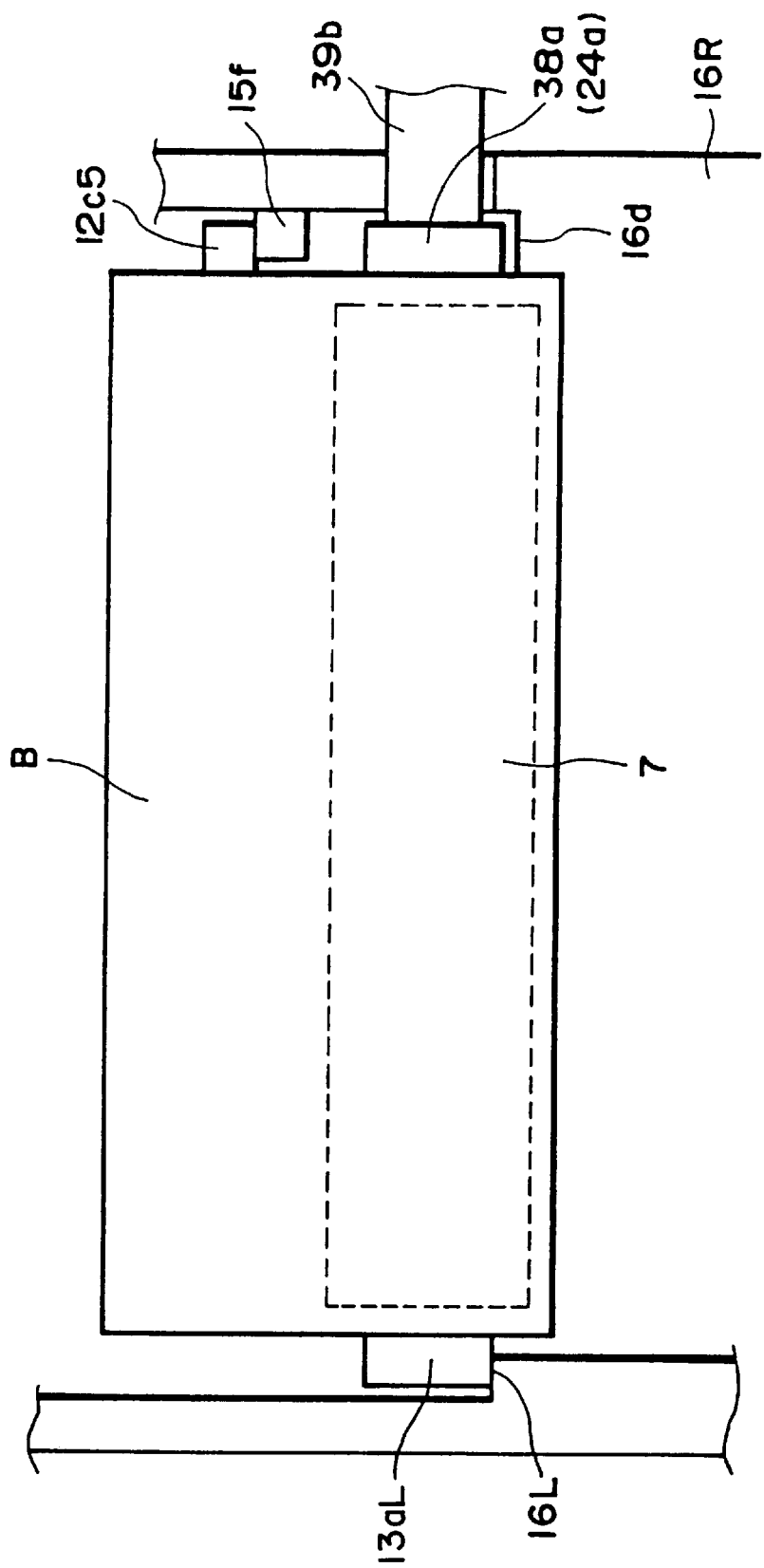

PROCESS CARTRIDGE AND ELECTROPHOTOGRAPHIC IMAGE FORMING APPARATUS

FIELD OF THE INVENTION AND RELATED ART

The present invention relates to a process cartridge and an electrophotographic image forming apparatus.

Here, the electrophotographic image forming apparatus forms an image on a recording material using an electrophotographic image formation process. Examples of the electrophotographic image forming apparatus includes an electrophotographic copying machine, an electrophotographic printer (laser beam printer, LED printer or the like), a facsimile machine and a word processor or the like.

The process cartridge contains integrally an electrophotographic photosensitive member and charging means, developing means or cleaning means, and is detachably mountable relative to a main assembly of the image forming apparatus. It may integrally contain the electrophotographic photosensitive member and at least one of the charging means, the developing means and the cleaning means. As another example, it may contain the electrophotographic photosensitive member and at least the developing means.

In an electrophotographic image forming apparatus using an electrophotographic image forming process, the process cartridge is used, which contains the electrophotographic photosensitive member and process means actable on said electrophotographic photosensitive member, and which is detachably mountable as a unit to a main assembly of the image forming apparatus (process cartridge type). With this process cartridge type, maintenance of the apparatus can be carried out in effect by the user without depending on a serviceman. Therefore, the process cartridge type is now widely used in electrophotographic image forming apparatuses.

The present invention is directed to a further improvement of such a process cartridge.

A driving system for a photosensitive member in a process cartridge type, is disclosed in U.S. Pat. Nos. 4,829,335 and 5,023,660.

SUMMARY OF THE INVENTION

Accordingly, it is a principal object of the present invention to provide a process cartridge and an electrophotographic image forming apparatus wherein driving force can be transmitted assuredly from a main assembly of an apparatus to an electrophotographic photosensitive drum of a process cartridge.

It is another object of the present invention to provide a process cartridge and an electrophotographic image forming apparatus wherein a process cartridge can be positioned in a direction substantially perpendicular to an axis of electrophotographic photosensitive drum.

It is a further object of the present invention to provide a process cartridge and an electrophotographic image forming apparatus wherein vibration of a process cartridge can be suppressed.

It is a further object of the present invention to provide a process cartridge and a electrophotographic image forming apparatus to which a process cartridge is detachably mountable, comprising a cartridge positioning portion for abutting to the main assembly positioning portion to stop a movement of said process cartridge beyond a predetermined distance in a direction substantially perpendicular to an axis of said photosensitive drum, when said process cartridge is mounted to the cartridge mounting portion, and said photosensitive drum receives the rotation driving force through interaction of a hole and a projection.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 37 is side view showing positioning of a process cartridge in a direction substantially perpendicular to an axis of a photosensitive drum.

DESCRIPTION OF THE PREFERRED EMBODIMENTS

Hereinafter, the embodiments of the present invention will be described with reference to the drawings.

Next, desirable embodiments of the present invention will be described. In the following description, the "widthwise" direction of a process cartridge B means the direction in which the process cartridge B is installed into, or removed from, the main assembly of an image forming apparatus, and coincides with the direction in which a recording medium is conveyed. The "lengthwise" direction of the process cartridge B means a direction which is intersectional with (substantially perpendicular to) the direction in which the process cartridge B is installed into, or removed from, the main assembly 14. The lengthwise direction is parallel to the surface of the recording medium, and intersectional with (substantially perpendicular to) the direction in which the recording medium is conveyed. Further, the "left" or "right" means the left or right relative to the direction in which the recording medium is conveyed, as seen from above.

Figure 1:
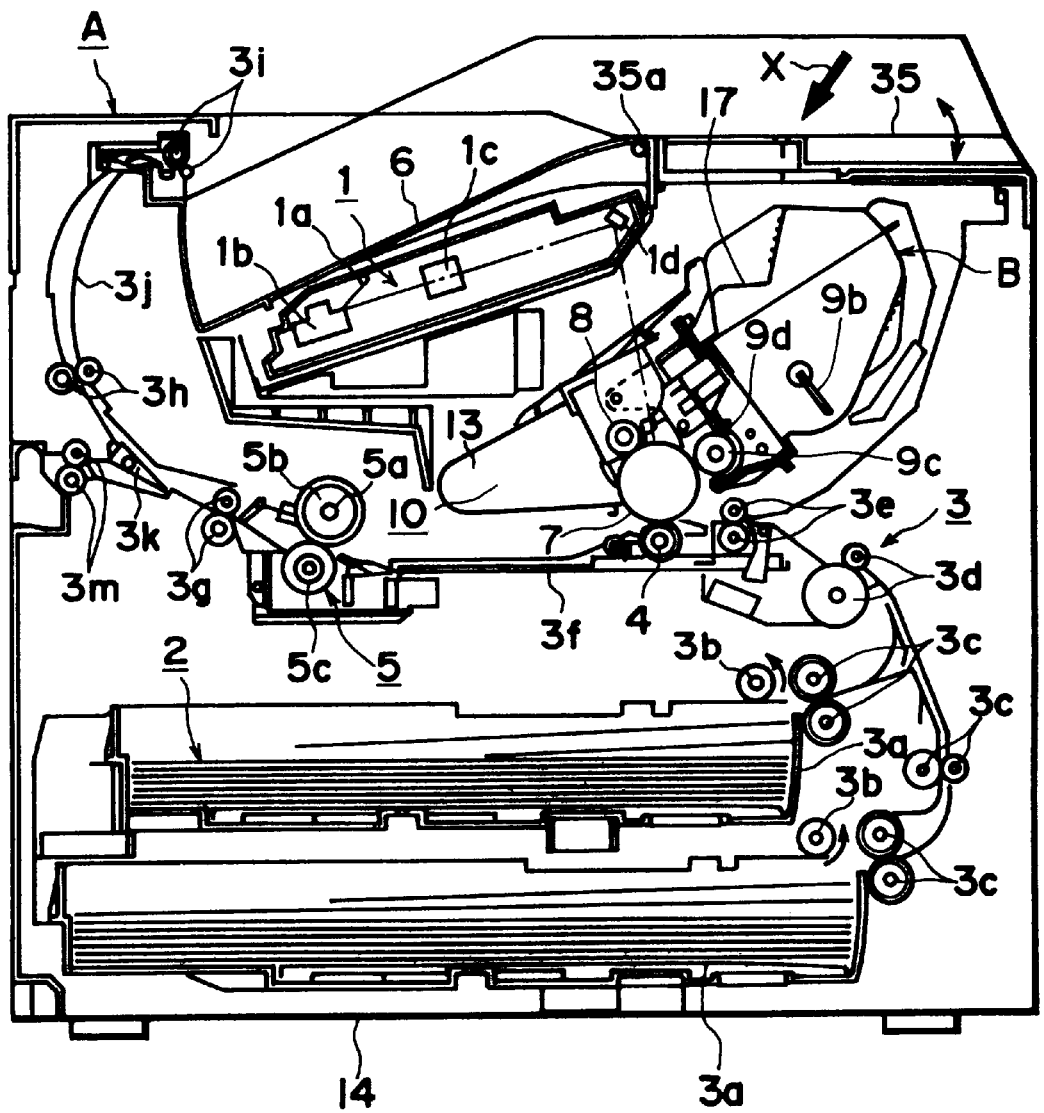
FIG. 1 is a vertical section of an electrophotographic image forming apparatus.
Figure 2:
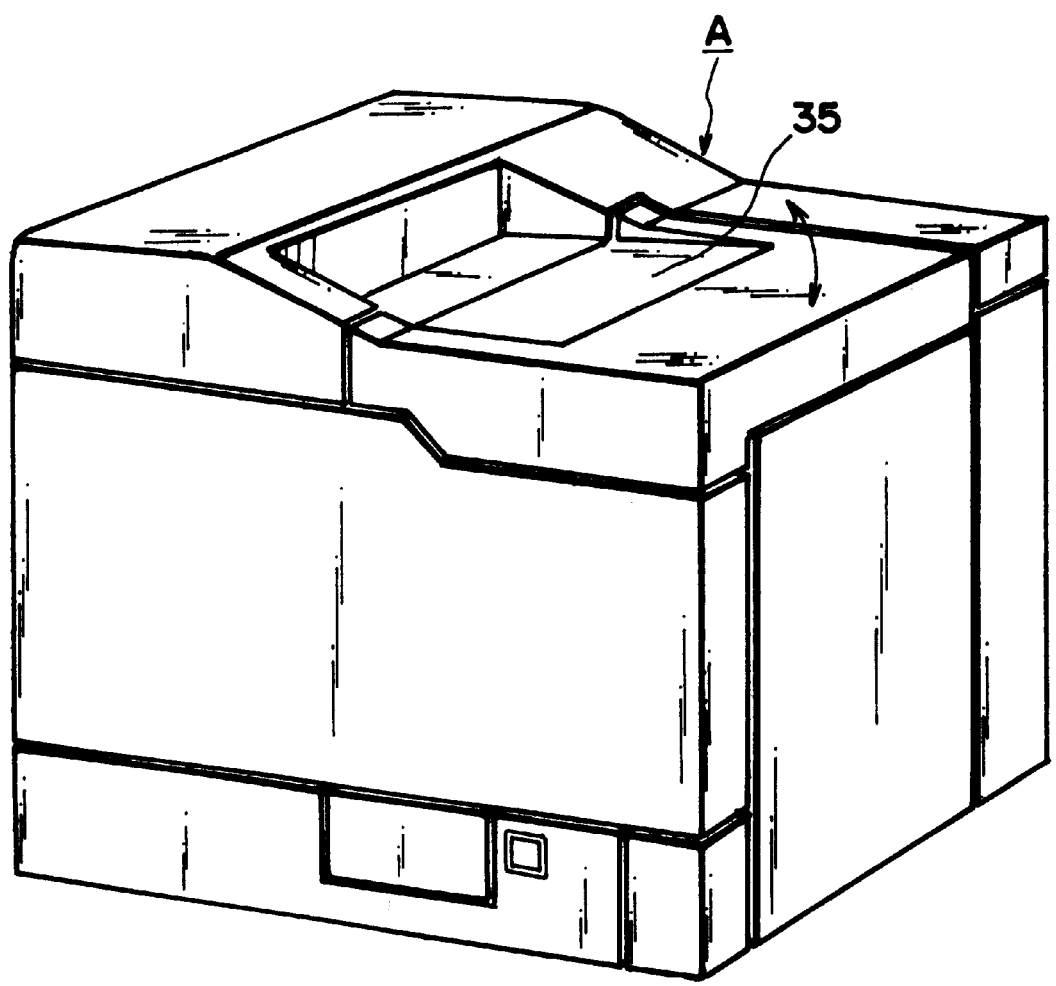
FIG. 2 is an external perspective view of the apparatus illustrated in FIG. 1.
Figure 3:
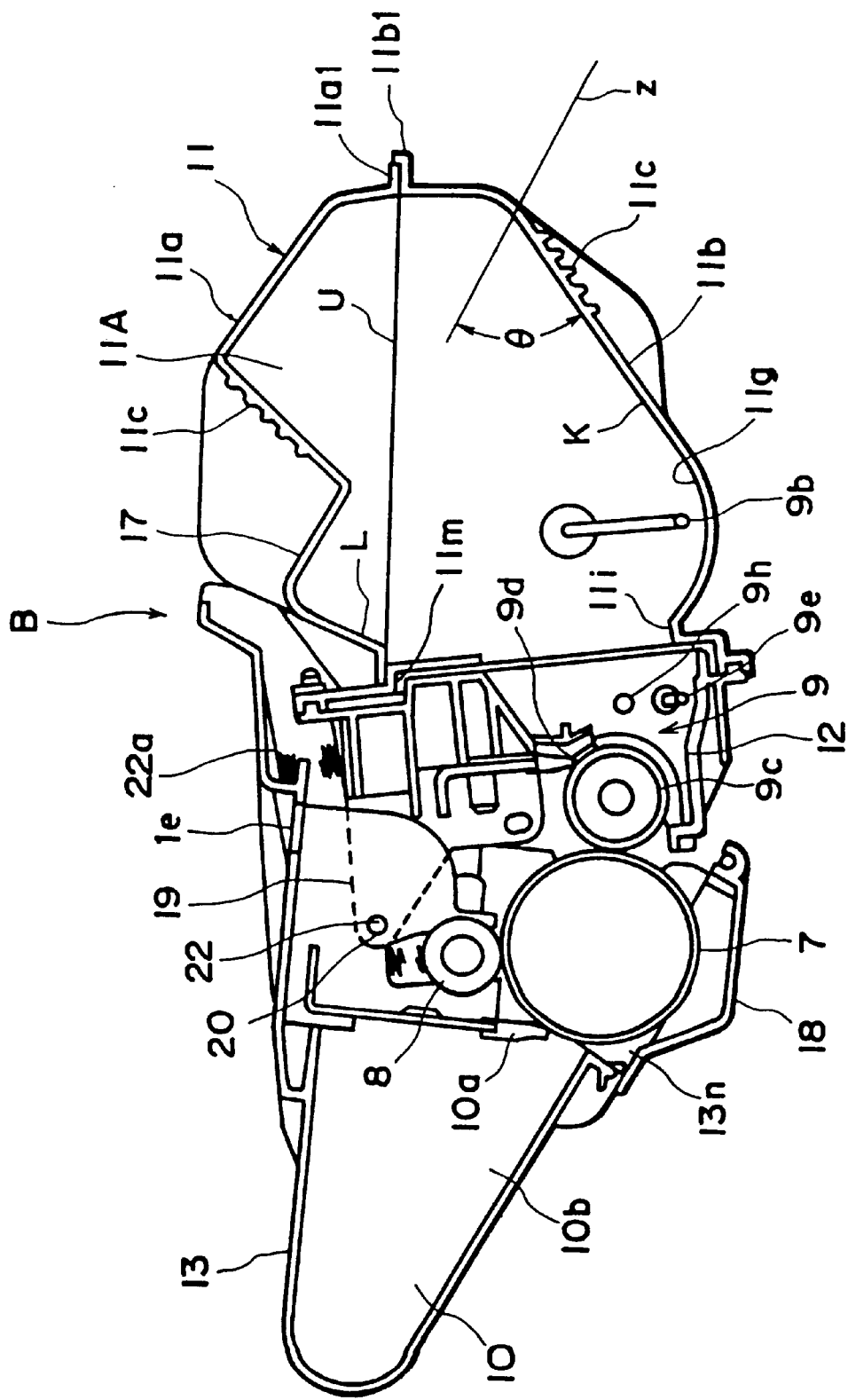
FIG. 3 is a cross-section of a process cartridge.
Figure 4:
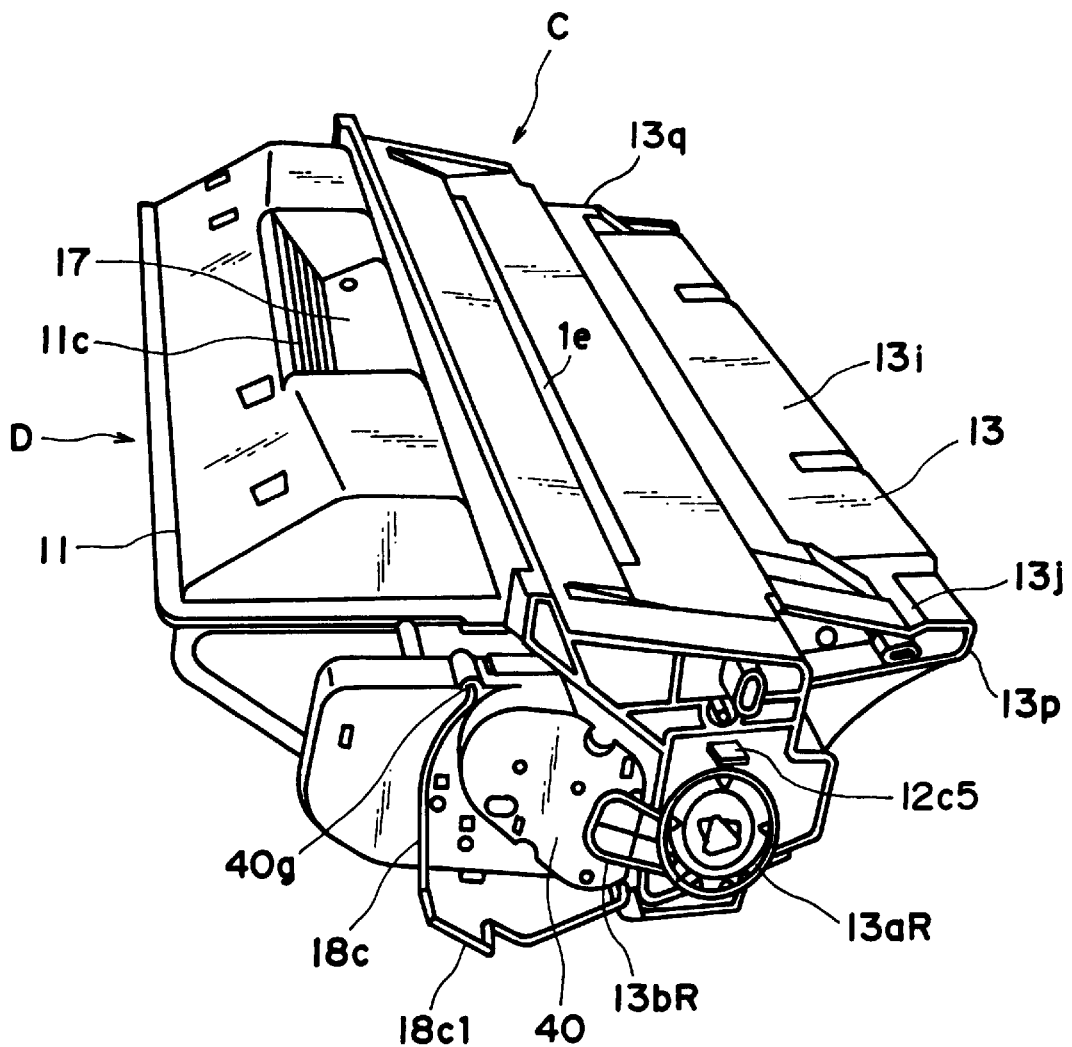
FIG. 4 is an external perspective view of the process cartridge illustrated in FIG. 3, as seen from the top right direction.
Figure 5:
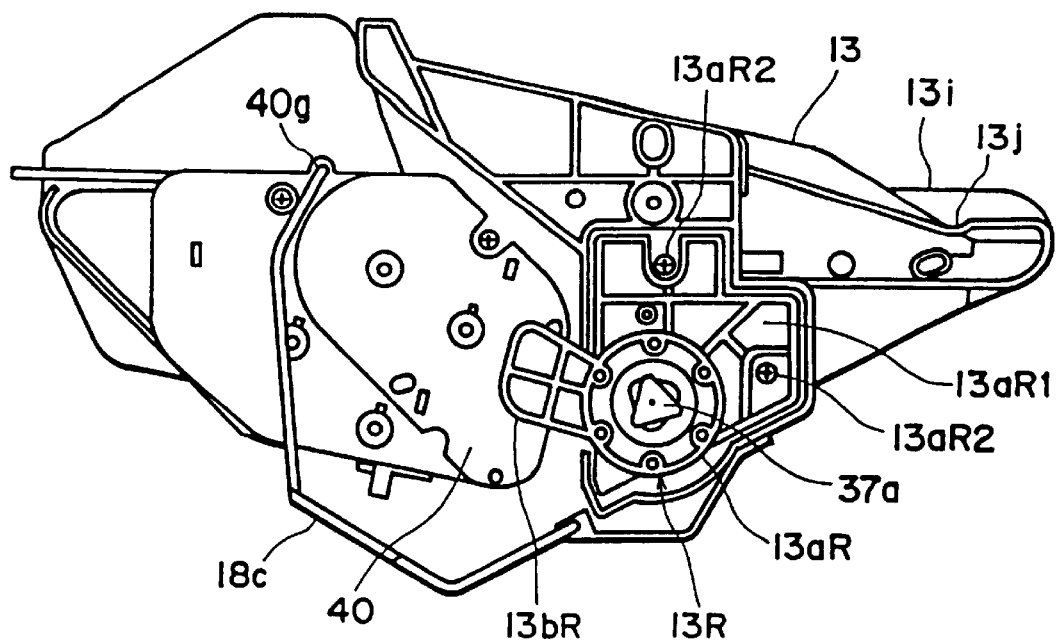
FIG. 5 is the right-hand side view of the process cartridge illustrated in FIG. 3.
Figure 6:
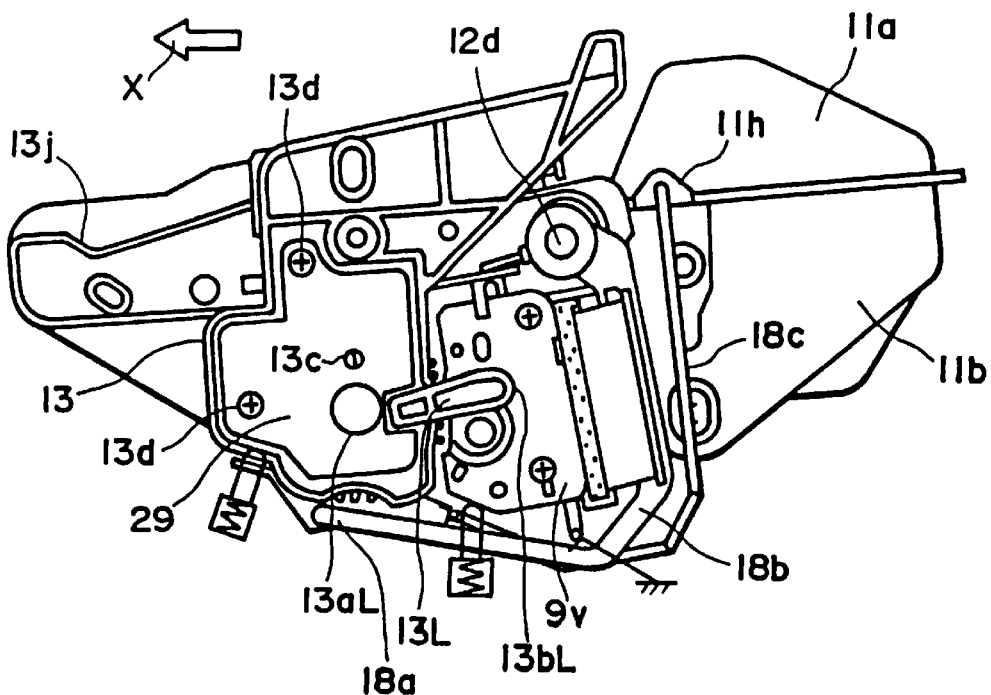
FIG. 6 is the left-hand side view of the process cartridge illustrated in FIG. 3.
Figure 7:
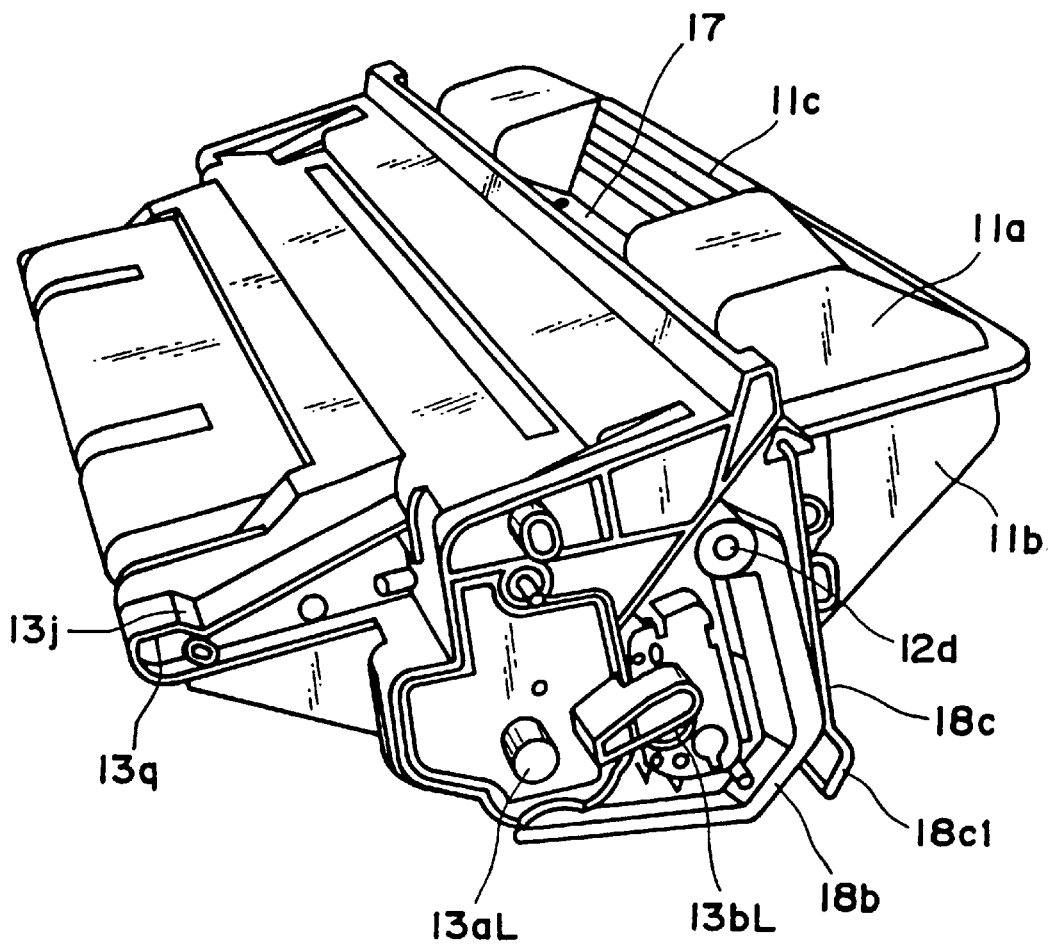
FIG. 7 is an external perspective view of the process cartridge illustrated in FIG. 3, as seen from the top left direction.
Figure 8:
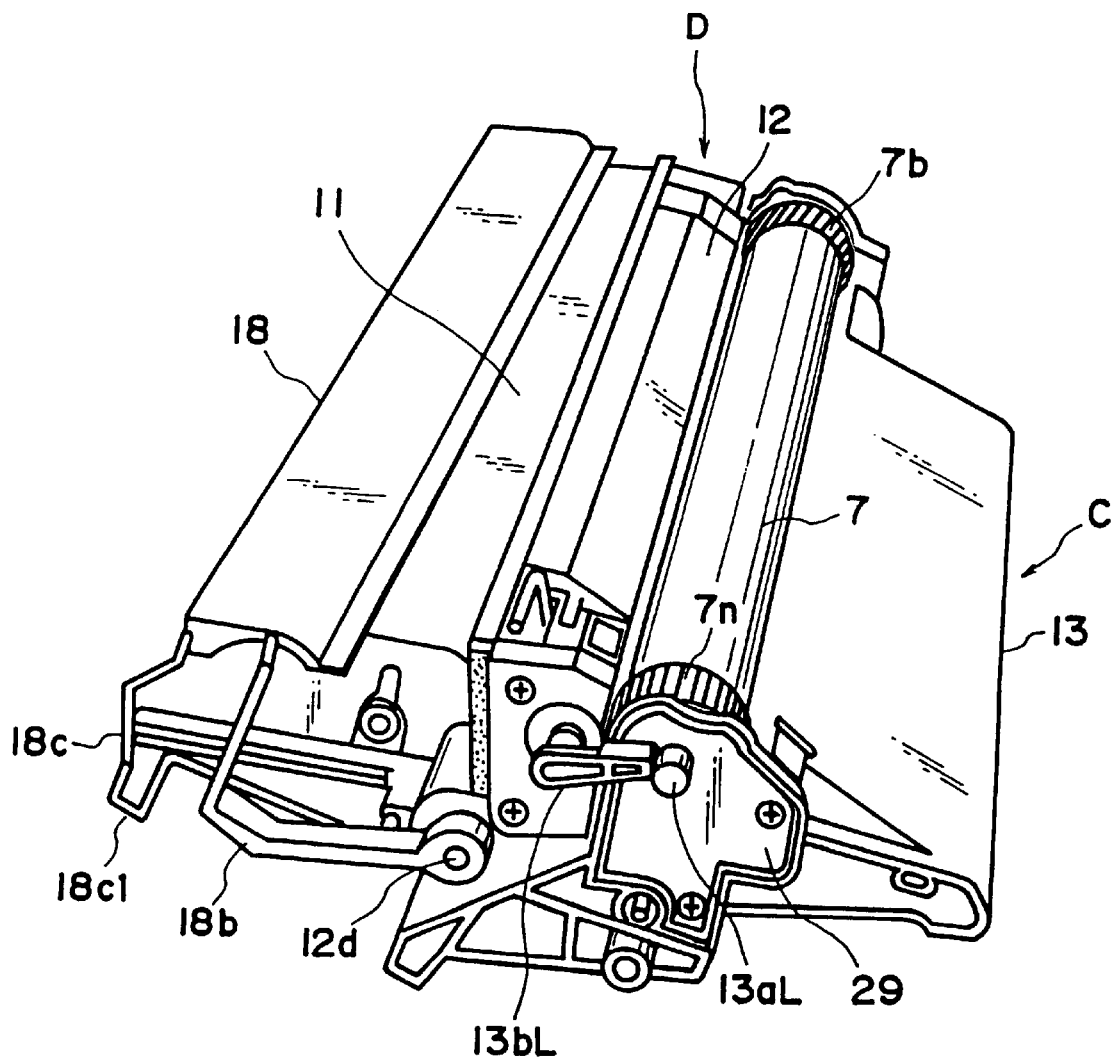
FIG. 8 is an external perspective view of the bottom left side of the process cartridge illustrated in FIG. 3.

FIG. 1 is an electrophotographic image forming apparatus (laser beam printer) which embodies the present invention, depicting the general structure thereof; FIG. 2, an external perspective thereof; and FIGS. 3–8 are drawings of process cartridges which embody the present invention. More specifically, FIG. 3 is a cross-section of a process cartridge; FIG. 4, an external perspective view of the process cartridge; FIG. 5, a right-hand side view of the process cartridge; FIG. 6, a left-hand side view of the process cartridge; FIG. 7, a perspective view of the process cartridge as seen from the top left direction; and FIG. 8 is a perspective view of the process cartridge as seen from the bottom left direction. In the following description, the "top" surface of the process cartridge B means the surface which faces upward when the process cartridge B is in the main assembly 14 of the image forming apparatus, and the "bottom" surface means the surface which faces downward.

Electrophotographic Image Forming Apparatus A and Process Cartridge B

First, referring to FIGS. 1 and 2, a laser beam printer A as an electrophotographic image forming apparatus which embodies the present invention will be described. FIG. 3 is a cross-section of a process cartridge which also embodies the present invention.

Referring to FIG. 1, the laser beam printer A is an apparatus which forms an image on a recording medium (for example, recording sheet, OHP sheet, and fabric) through an electrophotographic image forming process. It forms a toner image on an electrophotographic photosensitive drum (hereinafter, photosensitive drum) in the form of a drum. More specifically, the photosensitive drum is charged with the use of a charging means, and a laser beam modulated with the image data of a target image is projected from an optical means onto the charged peripheral surface of the photosensitive drum, forming thereon a latent image in accordance with the image data. This latent image is developed into a toner image by a developing means. Meanwhile, a recording medium 2 placed in a sheet feeding cassette 3a is reversed and conveyed by a pickup roller 3b, a conveyer roller pairs 3c and 3d, and register roller pair 3e, in synchronism with the toner formation. Then, voltage is applied to an image transferring roller 4 as a means for transferring the toner image formed on the photosensitive drum 7 of the process cartridge B, whereby the toner image is transferred onto the recording medium 2. Thereafter, the recording medium 2, onto which the toner image has been transferred, is conveyed to a fixing means 5 by guiding conveyer 3f. The fixing means 5 has a driving roller 5c, and a fixing roller 5b containing a heater 5a, and applies heat and pressure to the recording medium 2 as the recording medium 2 is passed through the fixing means 5, so that the image having been transferred onto the recording medium 2 is fixed to the recording medium 2. Then, the recording medium 2 is conveyed farther, and is discharged into a delivery tray 6 through a reversing path 3j, by discharging roller pairs 3g, 3h and 3i. The delivery tray 6 is located at the top of the main assembly 14 of the image forming apparatus A. It should be noted here that a pivotable flapper 3k may be operated in coordination with a discharge roller pair 3m to discharge the recording medium 2 without passing it through the reversing path 3j. The pickup roller 3b, conveyer roller pairs 3c and 3d, register roller pair 3e, guiding conveyer 3f, discharge roller pairs 3g, 3h and 3i, and discharge roller pair 3m constitute a conveying means 3.

Referring to FIGS. 3–8, in the process cartridge B, on the other hand, the photosensitive drum 7 with a photosensitive layer 7e (FIG. 11) is rotated to uniformly charge its surface by applying voltage to the charging roller 8 as a photosensitive drum charging means. Then, a laser beam modulated with the image data is projected onto the photosensitive drum 7 from the optical system 1 through an exposure opening 1e, forming a latent image on the photosensitive drum 7. The thus formed latent image is developed with the use of toner and the developing means 9. More specifically, the charging roller 8 is disposed in contact with the photosensitive drum 7 to charge the photosensitive drum 7. It is rotated by the rotation of the photosensitive drum 7. The developing means 9 provides the peripheral surface area (area to be developed) of the photosensitive drum 7 with toner so that the latent image formed on the photosensitive drum 7 is developed. The optical system 1 comprises a laser diode 1a, a polygon mirror 1b, a lens 1c, and a deflective mirror 1d (FIG. 1).

In the developing means 9, the toner contained in a toner container 11A is delivered to a developing roller 9c by the rotation of a toner feeding member 9b. The developing roller 9c contains a stationary magnet. It is also rotated so that a layer of toner with triboelectric charge is formed on the peripheral surface of the developing roller 9c. The image developing area of the photosensitive drum 7 is provided with the toner from this toner layer, the toner is transferred onto the peripheral surface of the photosensitive drum 7 in a manner to reflect the latent image, visualizing the latent image as a toner image. The developing blade 9d is a blade which regulates the amount of the toner adhered to the peripheral surface of the developing roller 9c and also triboelectrically charges the toner. Adjacent to the developing roller 9e, a toner stirring member 9c is rotatively disposed to circulatively stir the toner within the image developing chamber.

After the toner image formed on the photosensitive drum 7 is transferred onto the recording medium 2 by applying voltage with polarity opposite to that of the toner image to the image transferring roller 4, the residual toner on the photosensitive drum 7 is removed by the cleaning means 10. The cleaning means 10 comprises an elastic cleaning blade 10a disposed in contact with the photosensitive drum 7, and the toner remaining on the photosensitive drum 7 is scraped off by the elastic cleaning blade 10a, being collected into a waste toner collector 10b.

The process cartridge B is formed in the following manner. First, a toner chamber frame 11, which comprises a toner container (toner storing portion) 11A for storing toner, is joined with an image developing chamber frame 12 which houses the image developing means 9 such as an image developing roller 9c, and then, a cleaning chamber frame 13, in which the photosensitive drum 7, the cleaning means 10 such as the cleaning blade 10a, and the charging roller 8 are mounted, is joined with the preceding two frames 11 and 12 to complete the process cartridge B. The thus formed process cartridge B is removably installable into the main assembly 14 of the image forming apparatus A.

The process cartridge B is provided with an exposure opening through which a light beam modulated with image data is projected onto the photosensitive drum 7, and a transfer opening 13n through which the photosensitive drum 7 opposes the recording medium 2. The exposure opening 1e is a part of the cleaning chamber frame 13, and the transfer opening 13n is located between the image developing chamber frame 12 and the cleaning chamber frame 13.

Next, the structure of the housing of the process cartridge B in this embodiment will be described.

The process cartridge in this embodiment is formed in the following manner. First the toner chamber frame 11 and the image developing chamber frame 12 are joined, and then, the cleaning chamber frame 13 is rotatively joined with the preceding two frames 11 and 12 to complete the housing. In this housing, the aforementioned photosensitive drum 7, charging roller 8, developing means 9, cleaning means 10, and the like, are mounted to complete the process cartridge B. The thus formed process cartridge B is removably installable into the cartridge accommodating means provided in the main assembly 14 of an image forming apparatus.

Housing Structure of Process Cartridge B

As described above, the housing of the process cartridge B in this embodiment is formed by joining the toner chamber frame 11, the image developing chamber frame 12, and the cleaning chamber frame 13. Next, the structure of the thus formed housing will be described.

Figure 13:
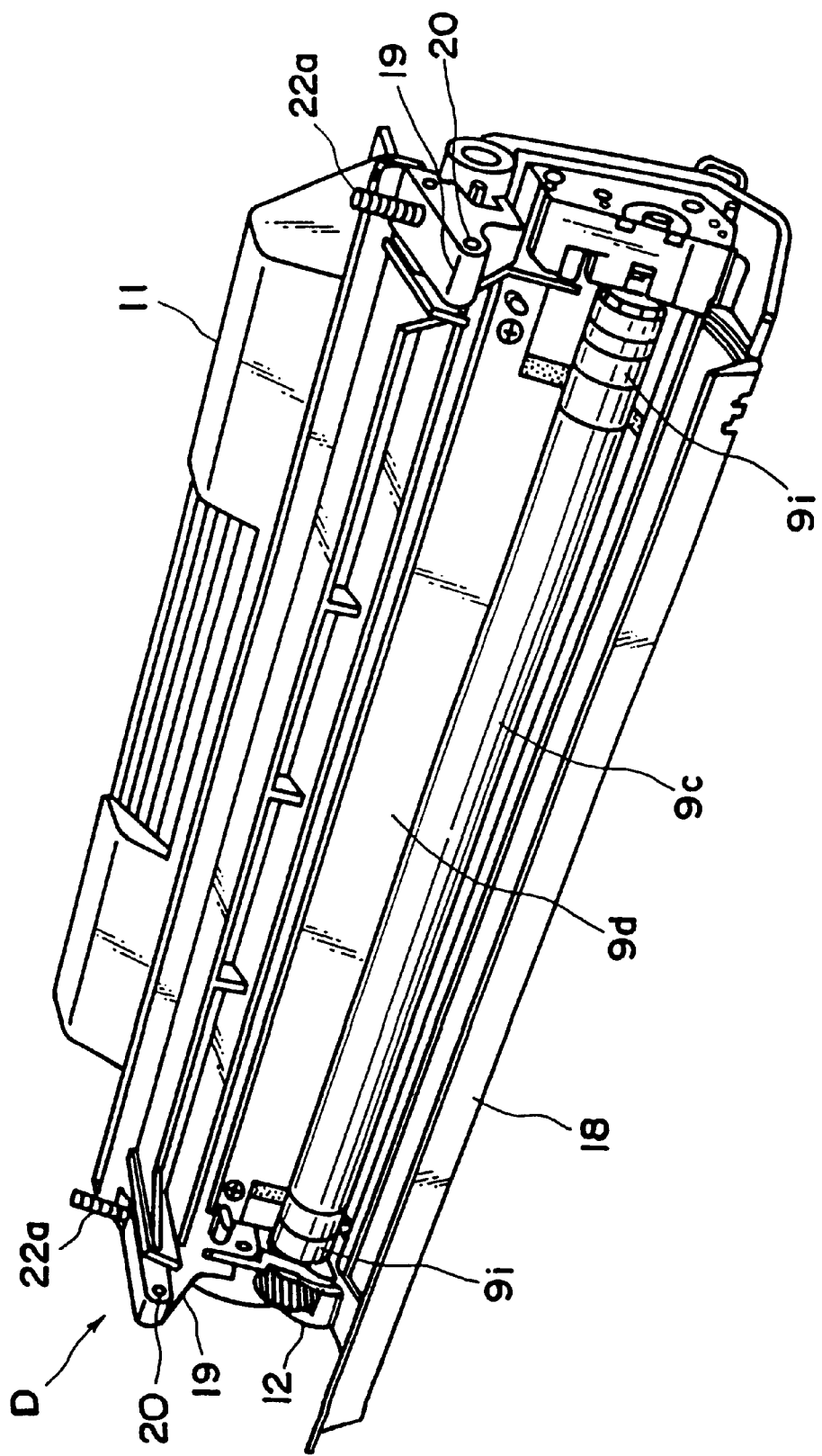
FIG. 13 is a perspective view of an image developing unit.
Figure 19:
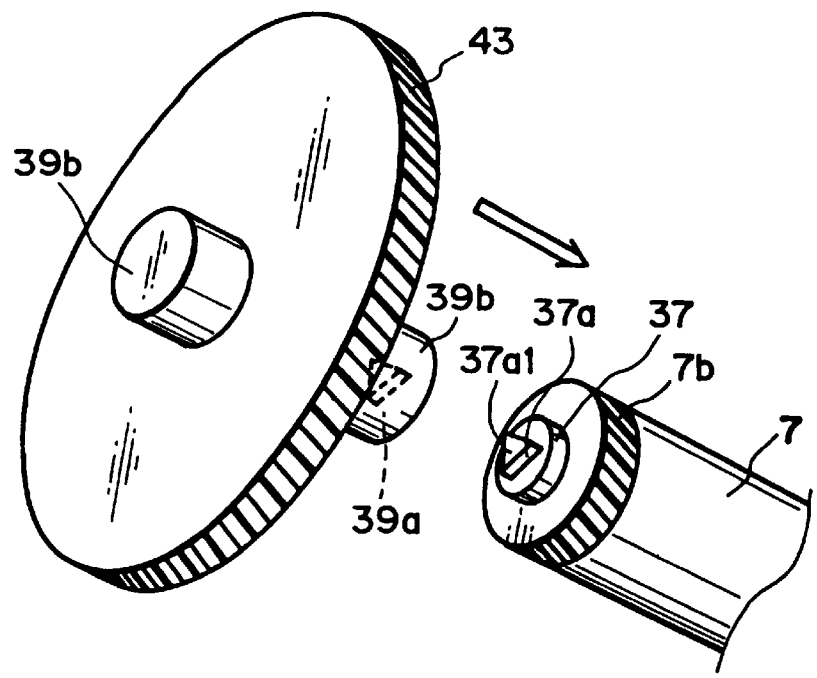
FIG. 19 is a perspective view of a shaft coupling member provided in a main assembly of an apparatus and a shaft coupling member provided in a process cartridge, according to an embodiment of the present invention.

Referring to FIGS. 3, in the toner chamber frame 11, the toner feeding member 9b is rotatively mounted. In the image developing chamber frame 12, the image developing roller 9c and the developing blade 9d are mounted, and adjacent to the developing roller 9e, the stirring member 9c is rotatively mounted to circulatively stir the toner within the image developing chamber. Referring to FIGS. 3 and 19, in the image developing chamber frame 12, a rod antenna 9h is mounted, extending in the lengthwise direction of the developing roller 9c substantially in parallel to the developing roller 9c. The toner chamber frame 11 and the development chamber frame 12, which are equipped in the above-described manner, are welded together (in this embodiment, by ultrasonic wave) to form a second frame which constitutes an image developing unit D (FIG. 13).

The image developing unit of the process cartridge B is provided with a drum shutter assembly 18, which covers the photosensitive drum 7 to prevent it from being exposed to light for an extend period of time or from coming in contact with foreign objects when or after the process cartridge B is removed from the main assembly 14 of an image forming apparatus.

Referring to FIG. 6, the drum shutter assembly 18 has a shutter cover 18a which covers or exposes the transfer opening 13n illustrated in FIG. 3, and linking members 18b and 18c which support the shutter cover 18a. On the upstream side relative to the direction in which the recording medium 2 is conveyed, one end of the right-hand side linking member 18c is fitted in a hole 40g of a developing means gear holder 40 as shown in FIGS. 4 and 5, and one end of the left-hand side linking member 18c is fitted in a boss 11h of the bottom portion 11b of the toner chamber frame 11. The other ends of the left- and right-hand linking members 18c are attached to the corresponding lengthwise ends of the shutter cover 18a, on the upstream side relative to the recording medium conveying direction. The linking member 18c is made of metallic rod. Actually, the left- and right-hand linking members 18c are connected through the shutter cover 18a; in other words, the left- and right-hand linking members 18c are the left- and right-hand ends of a single piece linking member 18c. The linking member 18b is provided only on one lengthwise end of the shutter cover 18a. One end of the linking member 18b is attached to the shutter cover 18a, on the downstream side, relative to the recording medium conveying direction, of the position at which the linking member 18c is attached to the shutter cover 18a, and the other end of the linking member 18b is fitted around a dowel 12d of the image development chamber frame 12. The linking member 18b is formed of synthetic resin.

The linking members 18b and 18c, which are different in length, form a four piece linkage structure in conjunction with the shutter cover 18a and the toner chamber frame 11. As the process cartridge B is inserted into an image forming apparatus, the portion 18c1 of the linking member 18c, which projects away from the process cartridge B, comes in contact with the stationary contact member (unillustrated) provided on the lateral wall of the cartridge accommodating space S of the main assembly 14 of the image forming apparatus, and activates the drum shutter assembly 18 to open the shutter cover 18a.

The drum shutter assembly 18, constituted of the shutter cover 18a and the linking members 18b and 18c, is loaded with the pressure from an unillustrated torsional coil spring fitted around a dowel 12d. One end of the spring is anchored to the linking member 18b, and the other end is anchored to the image developing chamber frame 12, so that the pressure is generated in the direction to cause the shutter cover 18a to cover the transfer opening 13n.

Referring again to FIGS. 3 and 12, the cleaning means frame 13 is fitted with the photosensitive drum 7, the charging roller 8, and the various components of the cleaning means 10, to form a first frame as a cleaning unit C (FIG. 12).

Figure 12:
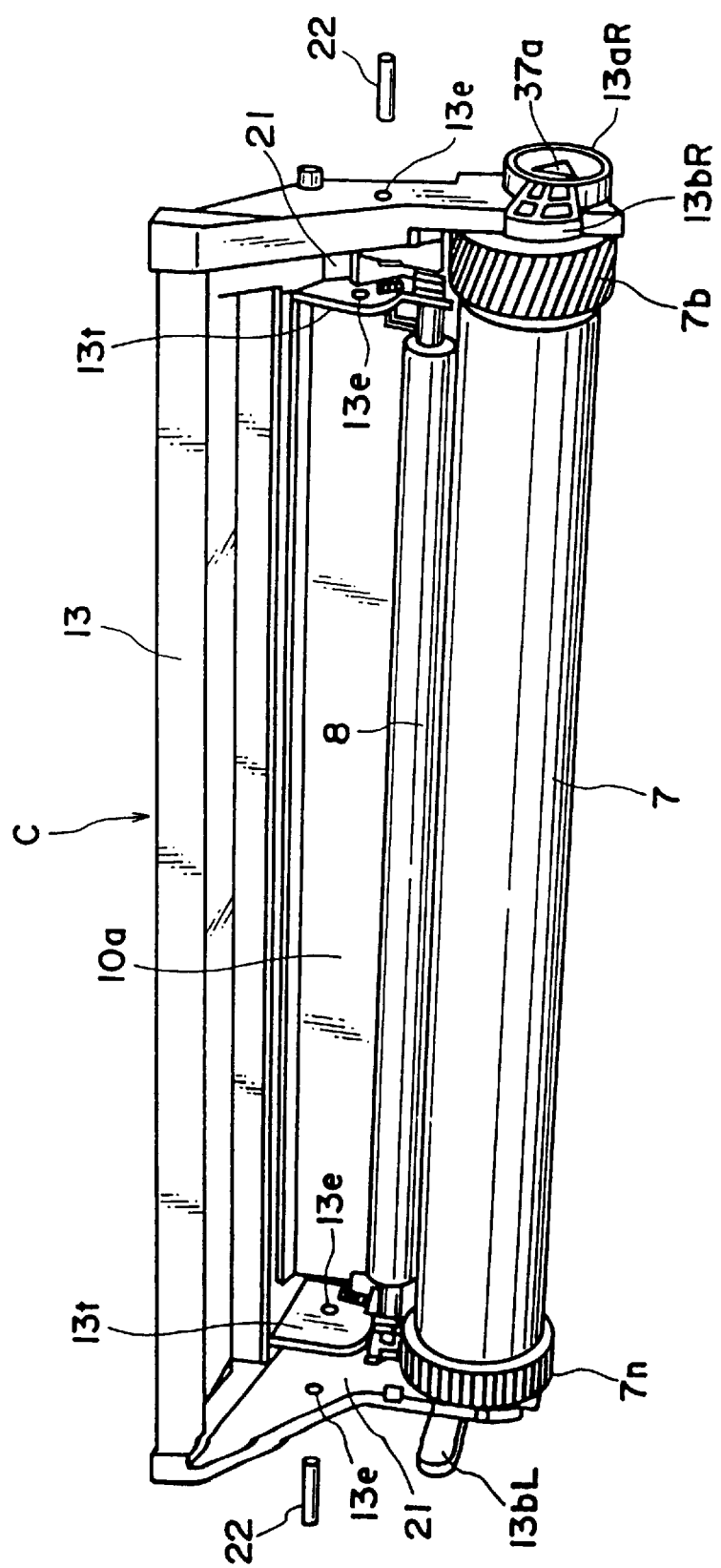
FIG. 12 is a perspective view of a cleaning unit.

Then, the aforementioned image developing unit D and cleaning unit C are joined with the use of a joining member 22, in a mutually pivotable manner, to complete the process cartridge B. More specifically, referring to FIG. 13, both lengthwise (axial direction of the developing roller 9c) ends of the image developing chamber frame 12 are provided with an arm portion 19, which is provided with a round hole 20 which is in parallel to the developing roller 9c. On the other hand, a recessed portion 21 for accommodating the arm portion 19 is provided at each lengthwise end of the cleaning chamber frame (FIG. 12). The arm portion 19 is inserted in this recessed portion 21, and the joining member 22 is pressed into the mounting hole 13e of the cleaning chamber frame 13, put through the hole 20 of the end portion of the arm portion 19, and pressed, farther, into the hole 13e of an partitioning wall 13t, so that the image developing unit D and the cleaning unit C are joined to be pivotable relative to each other about the joining member 22. In joining the image developing unit D and the cleaning unit C, a compression type coil spring 22a is placed between the two units, with one end of the coil spring being fitted around an unillustrated dowel erected from the base portion of the arm portion 19, and the other end being pressed against the top wall of the recessed portion 21 of the cleaning chamber frame 13. As a result, the image developing chamber frame 12 is pressed downward to reliably keep the developing roller 9c pressed downward toward the photosensitive drum 7. More specifically, referring to FIG. 13, a roller 9i having a diameter larger than that of the developing roller 9c is attached to each lengthwise end of the developing roller 9c, and this roller 9i is pressed on the photosensitive drum 7 to maintain a predetermined gap (approximately 300 µm) between the photosensitive drum 7 and the developing roller 9c. The top surface of the recessed portion 21 of the cleaning chamber frame 13 is slanted so that the compression type coil spring 22a is gradually compressed when the image developing unit D and the cleaning unit C are united. That is, the image developing unit D and the cleaning unit C are pivotable toward each other about the joining member 22, wherein the positional relationship (gap) between the peripheral surface of the photosensitive drum 7 and the peripheral surface of the developing roller 9c is precisely maintained by the elastic force of the compression type coil spring 22a.

Since the compression type coil spring 22a is attached to the base portion of the arm portion 19 of the image developing chamber frame 12, the elastic force of the compression type coil spring 22a affects only the base portion of the arm portion 19. In a case in which the image developing chamber frame 12 is provided with a dedicated spring mount for the compression type coil spring 22a, the adjacencies of the spring seat must be reinforced to precisely maintain the predetermined gap between the photosensitive drum 7 and the developing roller 9c. However, with the placement of the compression type coil spring 22a in the above described manner, it is unnecessary to reinforce the adjacencies of the spring seat, that is, the adjacencies of the base portion of the arm portion 19 in the case of this embodiment, because the base portion of the arm portion 19 is inherently greater in strength and rigidity.

Structure of Process Cartridge B Guiding Means

Figure 9:
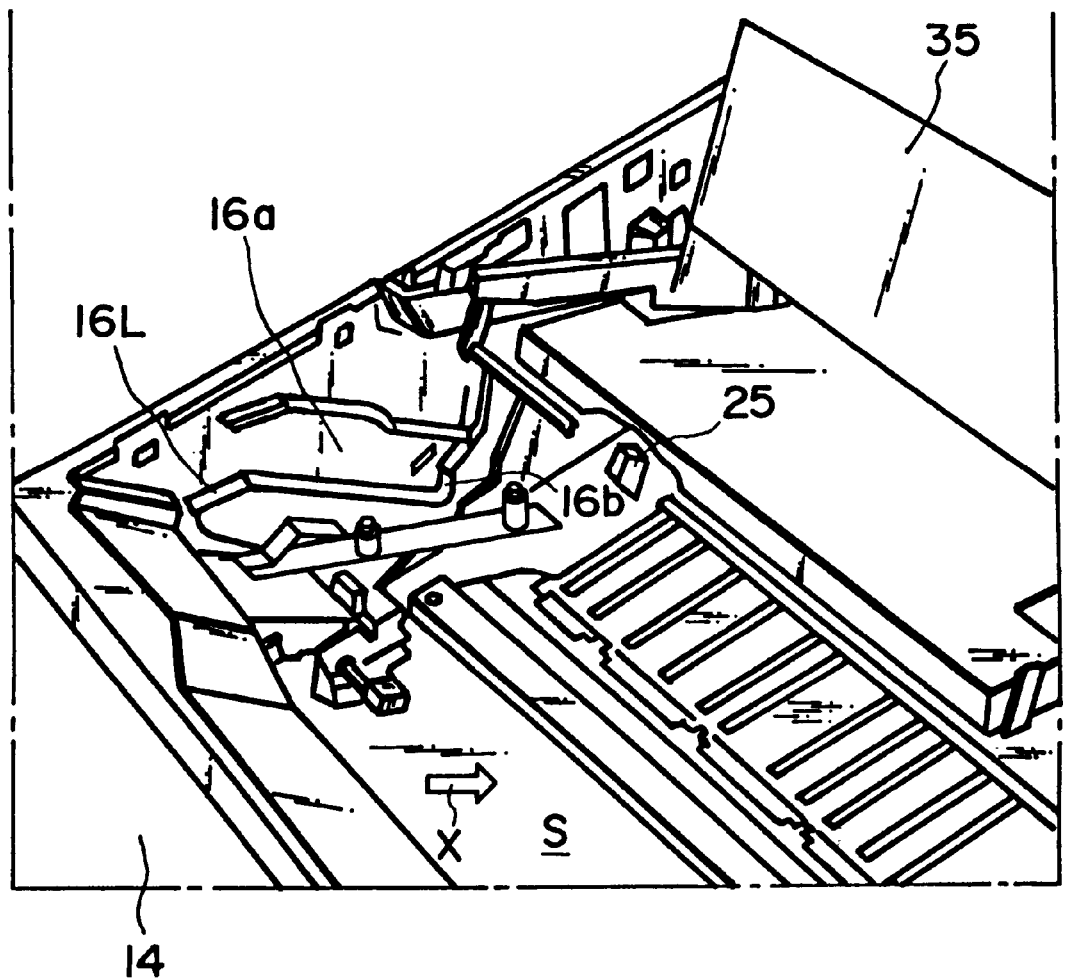
FIG. 9 is an external perspective view of the process cartridge accommodating portion of the main assembly of the apparatus illustrated in FIG. 1.
Figure 10:
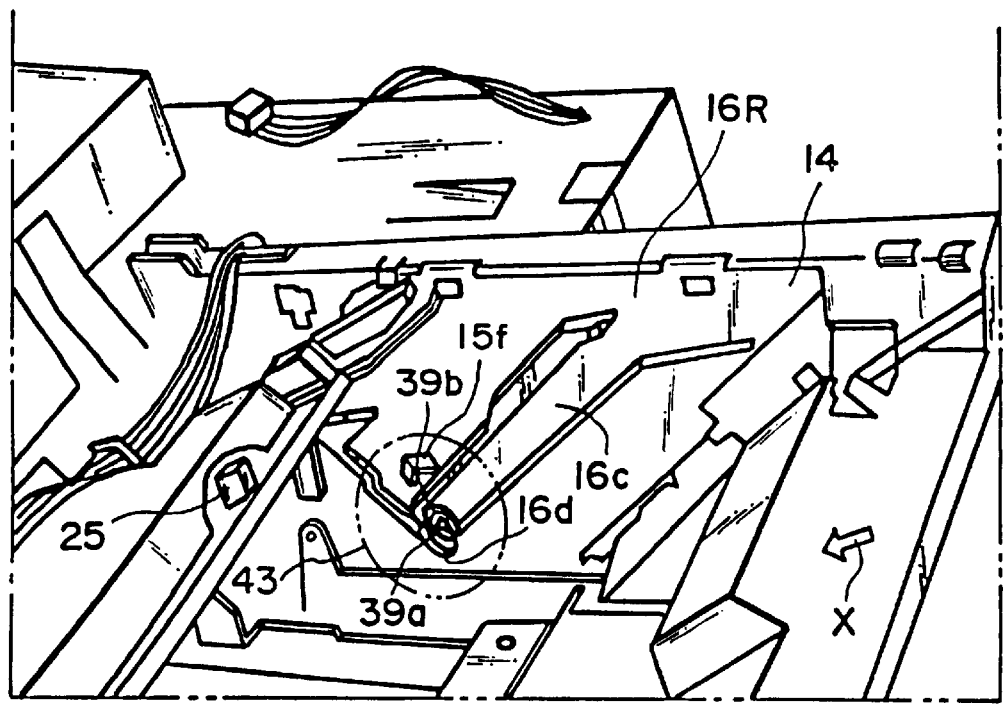
FIG. 10 is an external perspective view of the process cartridge accommodating portion of the main assembly of the apparatus illustrated in FIG. 1.

Next, the means for guiding the process cartridge B when the process cartridge B is installed into, or removed from, the main assembly 14 of an image forming apparatus will be described. This guiding means is illustrated in FIGS. 9 and 10. FIG. 9 is a perspective view of the left-hand side of the guiding means, as seen (in the direction of an arrow mark X) from the side from which the process cartridge B is installed into the main assembly 14 of the image forming apparatus A (as seen from the side of the image developing unit D side). FIG. 10 is a perspective view of the right-hand side of the same, as seen from the same side.

Referring to FIGS. 4, 5, 6 and 7, each lengthwise end of the cleaning frame portion 13 is provided with means which serves as a guide when the process cartridge B is installed into, or removed from, the apparatus main assembly 14. This guiding means is constituted of a cylindrical guides 13aR and 13aL as a cartridge positioning guiding member, and rotation controlling guides 13bR and 13bL as means for controlling the attitude of the process cartridge B when the process cartridge B is installed or removed.

As illustrated in FIG. 5, the cylindrical guide 13aR is a hollow cylindrical member. The rotation controlling guides 13bR is integrally formed together with the cylindrical guide 13aR, and radially protrudes from the peripheral surface of the cylindrical guide 13aR. The cylindrical guide 13aR is provided with a mounting flange 13aR1 which is also integral with the cylindrical guide 13aR. Thus, the cylindrical guide 13aR, the rotation controlling guide 13bR, and the mounting flange 13aR1 constitute the right-hand side guiding member 13R, which is fixed to the cleaning chamber frame 13 with small screws 13aR2 put through the screw holes of the mounting flange 13aR1. With the right-hand side guiding member 13R being fixed to the cleaning chamber frame 13, the rotation controlling guide 13bR extends over the lateral wall of the developing means gear holder 40 fixed to the image developing chamber frame 12.

Figure 11:
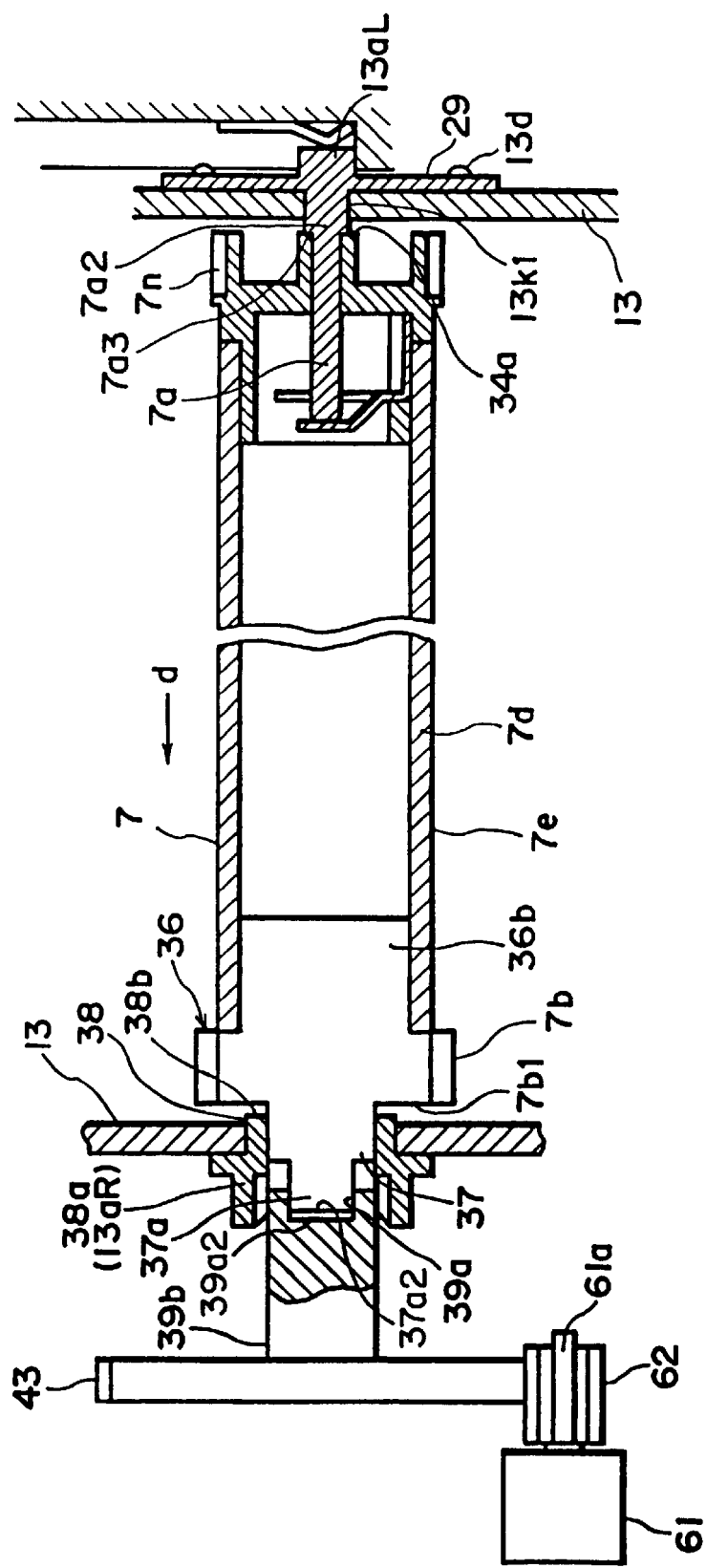
FIG. 11 is a vertical section of a photosensitive drum and a driving mechanism for driving the photosensitive drum.

Referring to FIG. 11, a drum shaft member is constituted of a drum shaft portion 7a inclusive of a larger diameter portion 7a2, a disk-shaped flange portion 29 and a cylindrical guide portion 13aL. The larger diameter portion 7a2 is fitted in the hole 13k1 of the cleaning frame portion 13. The flange portion 29 is engaged with a positioning pin 13c projecting from the side wall of the lengthwise end wall of the cleaning frame portion 13, being prevented from rotating, and is fixed to the cleaning frame portion 13 with the use of small screws 13d. The cylindrical guide 13aL projects outward (toward front, that is, the direction perpendicular to the page of FIG. 6). The aforementioned stationary drum shaft 7a which rotatively supports a spur gear 7n fitted around the photosensitive drum 7 projects inwardly from the flange 29 (FIG. 11). The cylindrical guide 13aL and the drum shaft 7a are coaxial. The flange 29, the cylindrical guide 13aL, and the drum shaft 7a, are integrally formed of metallic material such as steel.

Referring to FIG. 6, there is a rotation controlling guide 13bL slightly away from the cylindrical guide 13aL. It is long and narrow, extending substantially in the radial direction of the cylindrical guide 13aL and also projecting outward from the cleaning chamber frame 13. It is integrally formed with the cleaning chamber frame 13. In order to accommodate this rotation controlling guide 13bL, the flange 29 is provided with a cutaway portion. The distance the rotation controlling guide 13bL projects outward is such that its end surface is substantially even with the end surface of the cylindrical guide 13aL. The rotation controlling guide 13bL extends over the side wall of the developing roller bearing box 9v fixed to the image developing chamber frame 12. As is evident from the above description, the left-hand side guiding member 13L is constituted of two separate pieces: the metallic cylindrical guide 13aL and the rotation controlling guide 13bL of synthetic resin.

Next, a regulatory contact portion 13j, which is a part of the top surface of the cleaning chamber frame 13, will be described. In the following description of the regulatory contact portion 13j, "top surface" means the surface which faces upward when the process cartridge B is in the main assembly 14 of an image forming apparatus.

Referring to FIGS. 4–7, two portions 13j of the top surface 13i of the cleaning unit C, which are the portions right next to the right and left front corners 13p and 13q, relative to the direction perpendicular to the direction in which the process cartridge B is inserted, constitute the regulatory contact portions 13j, which regulate the position and attitude of the process cartridge B when the cartridge B is installed into the main assembly 14. In other words, when the process cartridge B is installed into the main assembly 14, the regulatory contact portion 13j comes in contact with the fixed contact member 25 provided in the main assembly 14 of an image forming apparatus (FIGS. 9 and 10), and regulates the rotation of the process cartridge B about the cylindrical guide 13aR and 13aL.

Next, the guiding means on the main assembly side 14 will be described. Referring to FIG. 1, as the lid 35 of the main assembly 14 of an image forming apparatus is pivotally opened about a supporting point 35a in the counterclockwise direction, the top portion of the main assembly 14 is exposed, and the process cartridge accommodating portion appears as illustrated in FIGS. 9 and 10. The left and right internal walls of the image forming apparatus main assembly 14, relative to the direction in which the process cartridge B is inserted, are provided with guide members 16L (FIG. 9) and 16R (FIG. 10), respectively, which extend diagonally downward from the side opposite to the supporting point 35a.

As shown in the drawings, the guide members 16L and 16R comprise guide portions 16a and 16c, and positioning grooves 16b and 16d connected to the guide portions 16a and 16c, respectively. The guide portions 16a and 16c extend diagonally downward, as seen from the direction indicated by an arrow mark X, that is, the direction in which the process cartridge B is inserted. The positioning grooves 16b and 16d have a semicircular cross-section which perfectly matches the cross-section of the cylindrical guides 13aL or 13aR of the process cartridge B. After the process cartridge B is completely installed in the apparatus main assembly 14, the centers of semicircular cross-sections of the positioning groove 16b and 16d coincide with the axial lines of the cylindrical guides 13aL and 13aR, respectively, of the process cartridge B, and hence, with the axial line of the photosensitive drum 7.

The width of the guide portions 16a and 16c as seen from the direction in which the process cartridge B is installed or removed is wide enough to allow the cylindrical guides 13aL and 13aR to ride on them with a reasonable amount of play. Therefore, the rotation controlling guide 13bL and 13bR which are narrower than the diameter of the cylindrical guide 13aL and 13aR naturally fit more loosely in the guide portions 16a and 16c than the cylindrical guides 13aL and 13aR, respectively, yet their rotation is controlled by the guide portions 16a and 16c. In other words, when the process cartridge B is installed, the angle of the process cartridge B is kept within a predetermined range. After the process cartridge B is installed in the image forming apparatus main assembly 14, the cylindrical guides 13aL and 13aR of the process cartridge B are in engagement with the positioning grooves 16b and 16d of the guiding members 16L and 16R, and the left and right regulatory contact portions 13j located at the front portion, relative to the cartridge inserting direction, of the cleaning chamber frame 13 of the process cartridge B, are in contact with the fixed positioning members 25, respectively.

The weight distribution of the process cartridge B is such that when the line which coincides with the axial lines of the cylindrical guide 13aL and 13aR is level, the image developing unit D side of the process cartridge B generates a larger moment about this line than the cleaning unit C side.

The process cartridge B is installed into the image forming apparatus main assembly 14 in the following manner. First, the cylindrical guides 13aL and 13aR of the process cartridge B are inserted into the guide portion 16a and 16c, respectively, of the cartridge accommodating portion in the image forming apparatus main assembly 14 by grasping the recessed portion 17 and ribbed portion 11c of the process cartridge B with one hand, and the rotation controlling guides 13bL and 13bR are also inserted into the guide portions 16a and 16c, tilting downward the front portion, relative to the inserting direction, of the process cartridge B. Then, the process cartridge B is inserted farther with the cylindrical guides 13aL and 13aR and the rotation controlling guides 13bL and 13bR of the process cartridge B following the guide portions 16a and 16c, respectively, until the cylindrical guides 13aL and 13aR reach the positioning grooves 16b and 16d of the image forming apparatus main assembly 14. Then, the cylindrical guides 13aL and 13aR become seated in the positioning grooves 16b and 16d, respectively, due to the weight of the process cartridge B itself; the cylindrical guides 13aL and 13aR of the process cartridge B are accurately positioned relative to the positioning grooves 16b and 16d. In this condition, the line which coincides with the axial lines of the cylindrical guides 13aL and 13aR also coincides with the axial line of the photosensitive drum 7, and therefore, the photosensitive drum 7 is reasonably accurately positioned relative to the image forming apparatus main assembly 14. It should be noted here that the final positioning of the photosensitive drum 7 relative to the image forming apparatus main assembly 14 occurs at the same time as the coupling between the two is completed.

Also in this condition, there is a slight gap between the stationary positioning member 25 of the image forming apparatus main assembly 14 and the regulatory contact portion 13j of the process cartridge B. At this point of time, the process cartridge B is released from the hand. Then, the process cartridge B rotates about the cylindrical guides 13aL and 13aR in the direction to lower the image developing unit D side and raise the cleaning unit C side until the regulatory contact portions 13j of the process cartridge B come in contact with the corresponding stationary positioning members 25. As a result, the process cartridge B is accurately positioned relative to the image forming apparatus main assembly 14. Thereafter, the lid 35 is closed by rotating it clockwise about the supporting point 35a.

In order to remove the process cartridge B from the apparatus main assembly 14, the above described steps are carried out in reverse. More specifically, first, the lid 35 of the apparatus main assembly 14 is opened, and the process cartridge B is pulled upward by grasping the aforementioned top and bottom ribbed portions 11c, that is, the handhold portions, of the process cartridge by hand. Then, the cylindrical guides 13aL and 13aR of the process cartridge B rotate in the positioning grooves 16b and 16d of the apparatus main assembly 14. As a result, the regulatory contact portions 13j of the process cartridge B separate from the corresponding stationary positioning member 25. Next, the process cartridge B is pulled more. Then, the cylindrical guides 13aL and 13aR come out of the positioning grooves 16b and 16d, and move into the guide portions 16a and 16c of the guiding members 16L and 16R, respectively, fixed to the apparatus main assembly 14. In this condition, the process cartridge B is pulled more. Then, the cylindrical guides 13aL and 13aR and the rotation controlling guides 13bL and 13bR of the process cartridge B slide diagonally upward through the guide portions 16a and 16c of the apparatus main assembly 14, with the angle of the process cartridge B being controlled so that the process cartridge B can be completely moved out of the apparatus main assembly 14 without making contact with the portions other than the guide portions 16a and 16c.

Referring to FIG. 12, the spur gear 7n is fitted around one of the lengthwise ends of the photosensitive drum 7, which is the end opposite to where the helical drum gear 7b is fitted. As the process cartridge B is inserted into the apparatus main assembly 14, the spur gear 7n meshes with a gear (unillustrated) coaxial with the image transferring roller 4 located in the apparatus main assembly, and transmits from the process cartridge B to the transferring roller 4 the driving force which rotates the transferring roller 4.

Toner Chamber Frame

Referring to FIGS. 3–7, the toner chamber frame will be described in detail.

Referring to FIG. 3, the toner chamber frame 11 is constituted of two portions: the top and bottom portions 11a and 11b. Referring to FIG. 1, the top portion 11a bulges upward, occupying the space on the side of the optical system 1 in the image forming apparatus main assembly 14, so that the toner capacity of the process cartridge B can be increased without increasing the size of the image forming apparatus A. Referring to FIGS. 3, 4 and 7, the top portion 11a of the toner chamber frame 11 has a recessed portion 17, which is located at the lengthwise center portion of the top portion 11a, and serves as a handhold. An operator of the image forming apparatus can handle the process cartridge B by grasping it by the recessed portion 17 of the top portion 11a and the downward facing side of the bottom portion 11b. The ribs 11c extending on the downward facing surface of the bottom portion 11b in the lengthwise direction of the bottom portion 11b serve to prevent the process cartridge B from slipping out of the operator's hand. Referring again to FIG. 3, the flange 11a1 of the top portion 11a is aligned with the raised-edge flange 11b1 of the bottom portion 11b, the flange 11a1 being fitted within the raised edge of the flange 11b1 of the bottom portion 11b, so that the walls of the top and bottom portions of the toner chamber frame 11 perfectly meet at the welding surface U, and then, the top and bottom portions 11a and 11b of the toner chamber frame 11 are welded together by melting welding ribs with the application of ultrasonic waves. The method for uniting the top and bottom portions 11a and 11b of the toner chamber frame 11 does not need to be limited to ultrasonic welding. They may be welded by heat or forced vibration, or may be glued together. Further, the bottom portion 11b of the toner chamber frame 11 is provided with a stepped portion 11m, in addition to the flange 11b1 which keeps the top and bottom portions 11a and 11b aligned when they are welded together by ultrasonic welding. The stepped portion 11m is located above an opening 11i and is substantially in the same plane as the flange 11b1. The structures of stepped portion 11m and its adjacencies will be described later.

Referring to FIG. 3, the slanted surface K of the bottom portion 11b of the toner chamber frame 11 is given an angle of θ so that the toner in the top portion of the toner chamber frame 11 naturally slides down as the toner at the bottom is consumed. More specifically, it is desirable that the angle θ formed between the slanted surface K when the process cartridge B is in the apparatus main assembly 14 and the horizontal line Z is approximately 65 deg. when the apparatus main assembly 14 is horizontally placed. The bottom portion 11b is given an outwardly bulging portion 11g so that it does not interfere with the rotation of the toner feeding member 9b. The diameter of the sweeping range of the toner feeding member 9b is approximately 37 mm. The height of the bulging portion 11g has only to be approximately 0–10 mm from the imaginary extension of the slanted surface K. This is due to the following reason: if the bottom surface of the bulging portion 11g is above the imaginary extension of the slanted surface K, the toner which, otherwise, naturally slides down from the top portion of the slanted surface K and is fed into the image developing chamber frame 12, partially fails to be fed into the image developing chamber frame 12, collecting in the area where the slanted surface K and the outwardly bulging portion 11g meet. Contrarily, in the case of the toner chamber frame 11 in this embodiment, the toner is reliably fed into the image developing chamber frame 12 from the toner chamber frame 11.

As described above, providing the bottom wall of the toner chamber frame section 11 with the outwardly bulging portion 11g as the sweeping space for the toner feeding member 9b makes it possible to provide the process cartridge B with stable toner feeding performance without cost increase.

When the process cartridge B is mounted to the main assembly 14 of the image forming apparatus, the cartridge side shaft coupling member and the main assembly side shaft coupling member of the apparatus are coupled to each other in interrelation with a closing operation of the openable member 35, as will be described hereinafter, and therefore, the photosensitive drum 7 or the like can be rotated by the main assembly 14.

Coupling and Driving Structure

The description will be made as to the structure of the coupling means which is a driving force transmission mechanism for transmitting the driving force to the process cartridge B from the main assembly 14 of the image forming apparatus.

Figure 14:
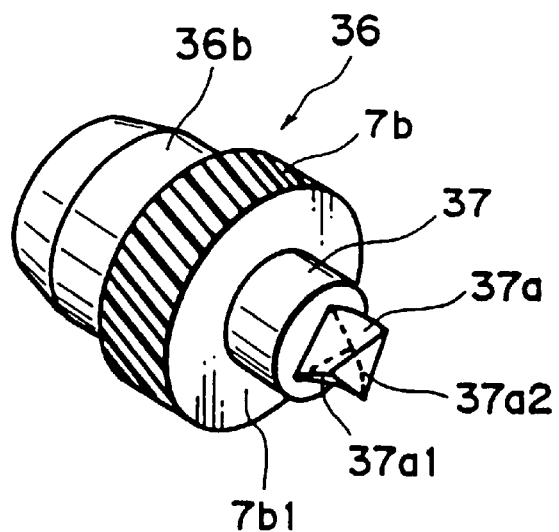
FIG. 14 is a perspective view of a drum flange (driving force transmitting part) according to an embodiment of the present invention.
Figure 15:
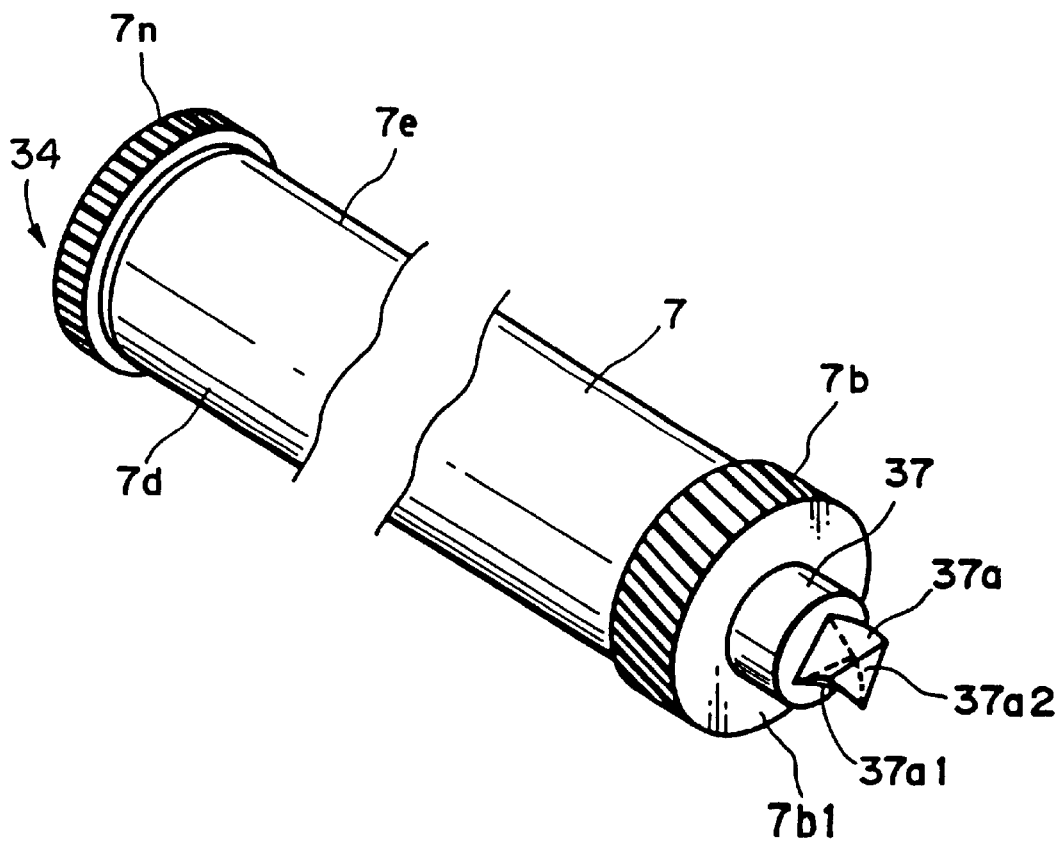
FIG. 15 is a perspective view of a photosensitive drum according to an embodiment of the present invention.
Figure 16:
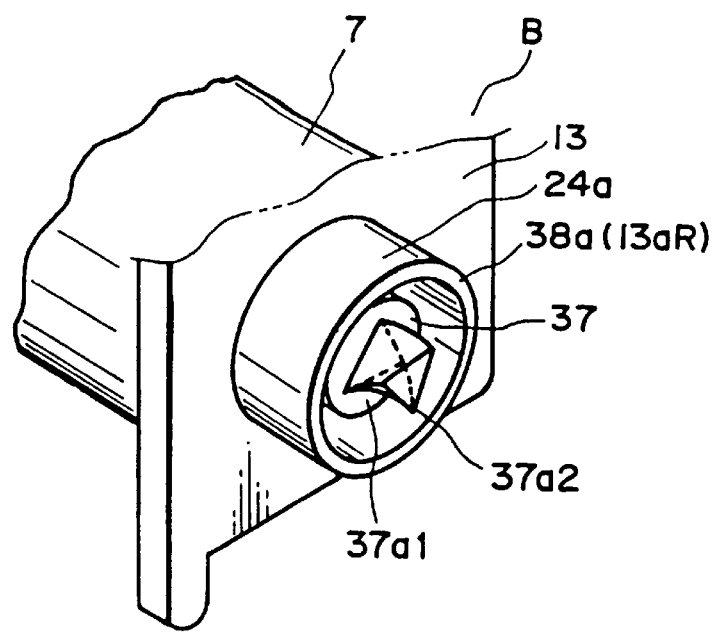
FIG. 16 is a perspective view is a shaft coupling portion of a process cartridge according to an embodiment of the present invention.
Figure 17:
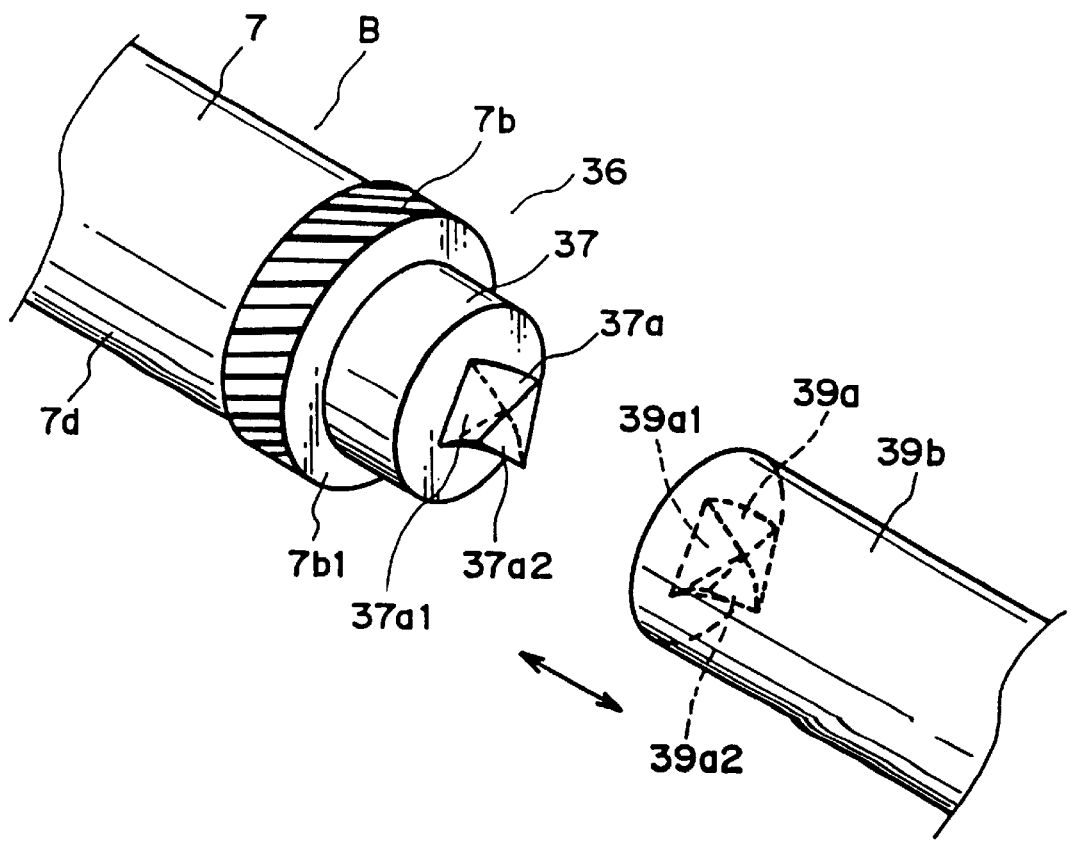
FIG. 17 is a perspective view of a shaft coupling according to and embodiment of the present invention.

FIG. 14 is a perspective view of a drum flange 36 as a driving force transmission part having an integrally formed male shaft 37; FIG. 15 is a partly sectional perspective view of the photosensitive drum 7 having the drum flange 36 mounted thereto; FIG. 11 is a sectional view wherein the photosensitive drum 7 is mounted to the process cartridge B; FIG. 16 is an enlarged perspective view of the male shaft 37 of the process cartridge B of FIG. 11; FIG. 17 shows a relation between the male shaft 37 (of the process cartridge B) and the female shaft 39b (provided to the main assembly 14).

As shown in FIG. 15 to FIG. 17, there is provided a cartridge side coupling means at a longitudinal end of the photosensitive drum 7 in the process cartridge B. The coupling means has the male coupling shaft 37 (circular column configuration) mounted to the drum flange 36 fixed an end of the photosensitive drum 7. Here, an end surface of a projection 37a is parallel with the end surface of the shaft 37. The male shaft 37 is for engaging with a bearing 38 and functions as a drum rotational shaft. In this example, the flange 36, male coupling shaft 37 and the projection 37a are integrally formed. The flange 36 is provided with a helical gear 7b for transmitting the driving force to the developing roller 9c in the process cartridge. Therefore, as shown in FIG. 14, the drum flange 36 is an integrally molded member having the helical gear 7b, the male shaft 37 and the projection 37a, and is a driving force transmission part having the function of transmitting the driving force.

The projection 37a has a twisted polygonal prism configuration, more particularly, the configuration resulting from twisting a substantially equilateral triangular prism in the rotational direction. A recess 39a of the shaft 39b is a polygonal shape twisted in the rotational direction of the shaft 39b and therefore is engageable with or complementary with the projection 37a. The recess 39a has a section of substantially equilateral triangle. The recess 39a integrally rotates with a gear 43 of the main assembly 14. In the structure of this example, the process cartridge B is mounted to the main assembly 14, and the projection 37a of the process cartridge B and the recess 39a of the main assembly 14 are engaged. When the rotation force is transmitted from the recess 39a to the projection 37a, the apexes of the equilateral triangle of the projection 37a are contacted regularly with the inside surfaces of the recess 39a. Further, the force in the direction of pulling the projection 37a into to the recess 39a is produced during rotation due to the twisting directions thereof, so that the end surface 37a2 of the projection is contacted to the recess 39a. Since the photosensitive drum 7 is integral with the projection 37a, the axial position there is correctly determined in the main assembly 14 of the image forming apparatus.

In this example, as seen from the photosensitive drum 7, the direction of twisting of the projection 37a is opposite from the rotation direction of the photosensitive drum 7, away from the base portion of the projection toward the end portion thereof. The direction of twisting of the recess 39a is opposite therefrom, away from the inlet portion of the recess 39a toward the inside. The direction of twisting of the helical gear 7b of the drum flange 36, which will be described hereinafter, is opposite from the twisting direction of the projection 37a.

Figure 24A:
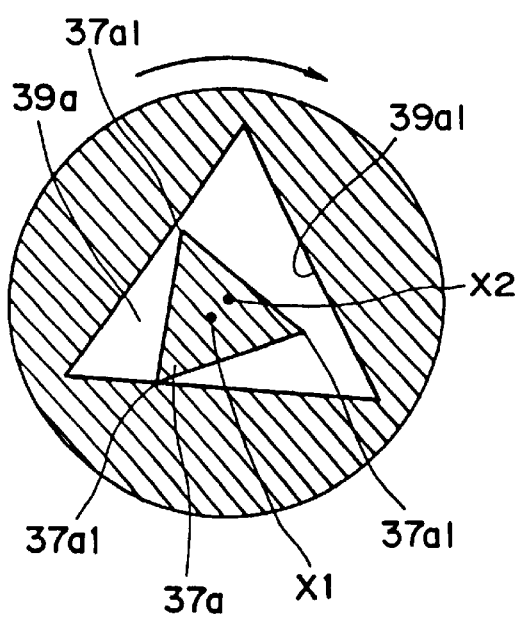
FIGS. 24(a) and 24(b) are a sectional view of a male coupling projection and recess according to an embodiment of the present invention.
Figure 24B:
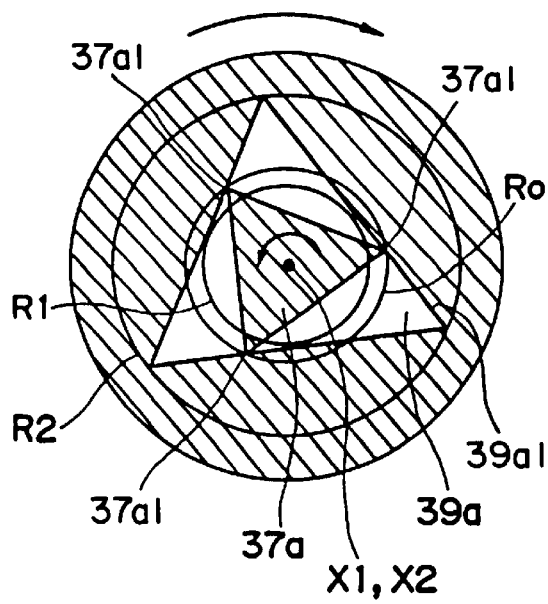

As shown in FIG. 24, the projection 37a and the recess 39a satisfy d1<d0<d2, where d0 is a diameter of a circumscribed circle R0 of the triangular prism of the projection 37a, d1 is a diameter of an inscribed circle R1 of the space in the form of triangle of the recess 39a, and d2 is a diameter of a circumscribed circle R2 of the triangle.

Preferable examples of the numerical ranges of the diameters are as follows:

d0=approx. 3 mm–70 mm
d1=approx. 3 mm–70 mm
d2=approx. 3 mm–70 mm

In these ranges, the sizes are selected so as to satisfy the above-described relations.

In this example, the sizes are as follows:

d0=approx. 16 mm
d1=approx. 9.5 mm
d2=approx. 17.5 mm

The amounts of twisting of the projection 37a and the recess 39a are enough to move the photosensitive drum 7 and/or the process cartridge B in the longitudinal direction when the projection 37a and the recess 39a are rotated; more particularly, in this embodiment, the twisting angle at the contact portion of the projection 37a and the recess 39a is approx. 7.5°.

However, the present invention is not limited to these values.

The position of a cross-section of a three dimensional member is determined by three contact points, theoretically. When the configurations of the projections 37a and the recesses 39a are substantially equilateral triangular, the apexes 37a1 of the projection 37a are contacted to the inside surfaces 39a1 of the equilateral triangle of the recess 39a under the same conditions. Therefore, the changes of the contact points and the rotation non-uniformity of the coupling driving due to the load variation during the rotation of the process cartridge B are minimized, thus improving the rotation accuracy of the photosensitive drum 7 (FIG. 24(a), (b)). The male shaft 37 and projection 37a are provided on the drum flange 36 so that when the drum flange 36 is mounted to an end of the photosensitive drum 7, it is aligned with the axis of the photosensitive drum 7. Designated by 36b (FIG. 14) is an engaging portion which is engaged with an inside surface of the drum cylinder 7d when the drum flange 36 mounted to the photosensitive drum 7. The drum flange 36 is mounted to the photosensitive drum 7 by cramping, bonding or the like. The outer surface of the drum cylinder 7d is coated with a photosensitive material 7e (FIGS. 11 and 15).

As described hereinbefore, the process cartridge B of this embodiment is as follows:

A process cartridge detachably mountable to a main assembly of an forming apparatus 14, wherein said main assembly includes a motor 61, a main assembly side gear 43 for receiving driving force from said motor 61 and a hole 39a defined by twisted surfaces, said hole 39a being substantially coaxial with said gear 43; an electrophotographic photosensitive drum 7;

process means (8, 9, 10) actable on said photosensitive drum 7; and a twisted projection 37 engageable with said twisted surfaces, said projection 37 being provided at a longitudinal end of said photosensitive drum 7, wherein when said main assembly side gear 43 rotates with said hole 39a and projection 37 engaged with each other, rotational driving force is transmitted from said gear 43 to said photosensitive drum 7 through engagement between said hole 39a and said projection 37.

The twisted projection 37 is provided at a longitudinal end of said photosensitive drum 7, and has a non-circular cross-section and substantially coaxial with a rotation axis of said photosensitive drum 7, wherein said projection 37 of said photosensitive drum 7 has such a dimension and configuration that it can take a first relative rotational position with respect to a recess 39a of the driving rotatable member (main assembly side gear 43) in which relative rotational movement therebetween is permitted, and a second relative rotational position with respect to said recess 39a of said driving rotatable member in which relative rotational movement is prevented in one rotational direction.

A drum flange 34 is fixed to the other end side of the photosensitive drum 7. The drum flange 34 has a spur gear 7n integrally formed therewith (FIG. 11) reference.

When the process cartridge B is mounted to the main assembly 14 of the apparatus, the cylindrical guide 13aL is brought into engagement with a U-shaped positioning groove 16b (FIG. 9) and therefore is positioned, and a spur gear 7n (integrally molded with the drum flange 34) is brought into meshing engagement with a gear (unshown) for transmitting driving force to the transfer roller 4.

Examples of the material of the drum flanges 34, 36 include polyacetal, polycarbonate and polyamide, polybutylene terephthalate, or another resin material. Other materials are usable.

Around the projection 37a of the male coupling shaft 37 of the process cartridge B, a cylindrical boss 38a concentric with the male shaft 37 is provided integrally with a bearing 38 fixed to the cleaning frame 13 (FIG. 11). When the process cartridge B is mounted to or demounted from the main assembly, the male coupling projection 37a is protected by the boss 38a, and therefore, the liability of damage thereto or deformation thereof is reduced. Thus, the vibration or wobbles during the coupling driving operation due to the damage of the projection 37a, can be avoided.

The configuration of the boss 38a is not limited to the circular shape of this embodiment, and it is not inevitably completely circular but may be part-circular provided that it can be guided by the guide portion 16c and can be snugly engaged with the groove 16d. In this embodiment, the bearing 38 for rotatably supporting the male coupling shaft 37 and the cylindrical boss 38a are integrally molded and threaded to the cleaning frame 13 (FIG. 11), but the bearing 38 and the boss 38a may be separate members.

In this embodiment, the drum flange 34 is engaged with the drum shaft 7a, which is integral with the cylindrical guide 13aL provided in the cleaning frame 13 (FIG. 11), and the male coupling shaft 37 is engaged with the inner surface of the bearing 38 provided in the cleaning frame 13; and in this state, the photosensitive drum 7 is mounted to the cleaning frame 13 of the process cartridge B. Then, the photosensitive drum 7 is rotated about the drum shaft 7a and the male coupling shaft 37. In this embodiment, the photosensitive drum is mounted to the cleaning frame 13 for movement in the axial direction, as shown in FIG. 11. This is done in consideration of the mounting tolerance. However, this is not limiting, and it may be mounted immovably relative to the cleaning frame 13 in the axial direction. In this case, the end surface 7b1 (end surface of the helical gear 7b) of the drum flange 36 is slidably contacted to the end surface 38b of the bearing 38, and the end surface 34a of the drum flange 34 may be slidably contacted to the stepped portion 7a3 of the drum shaft 7a fixed to the cleaning frame 13.

Figure 18:
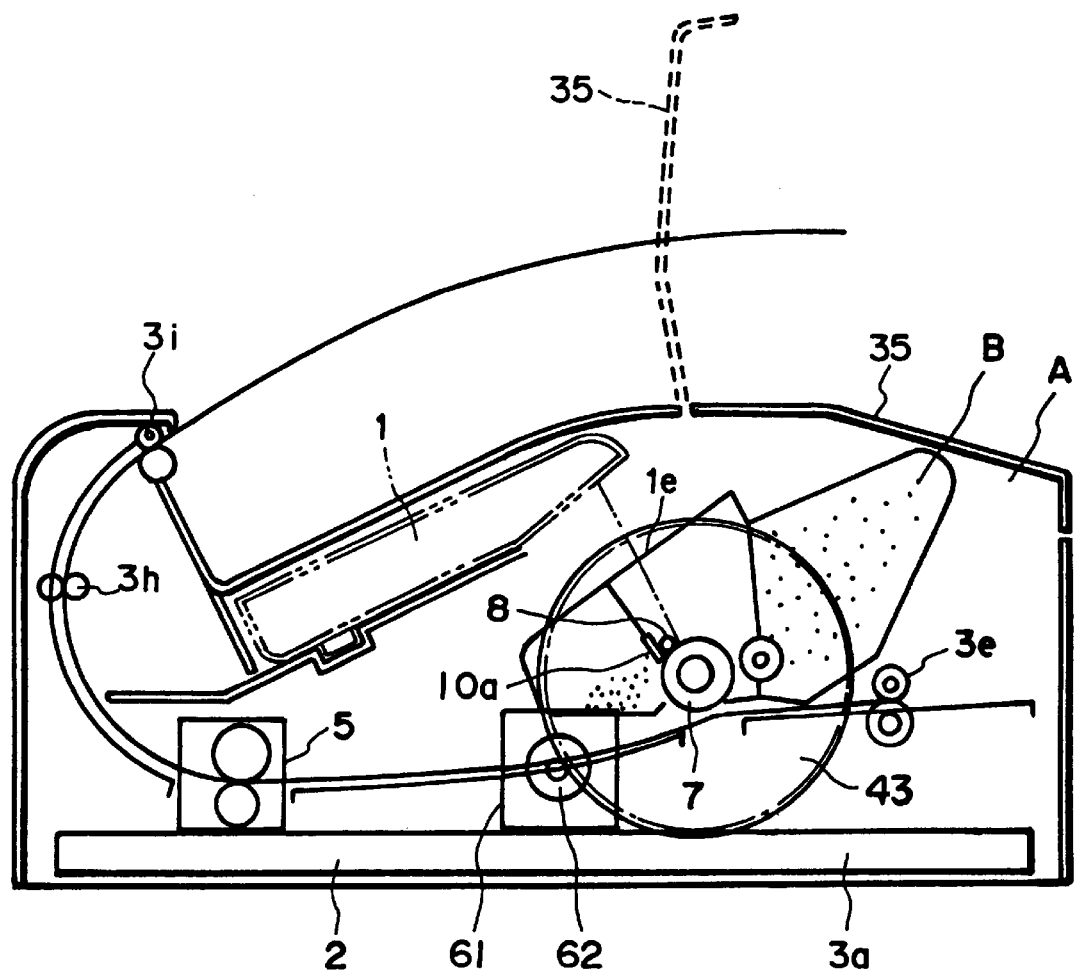
FIG. 18 is a sectional view of a driving system of a main assembly of an electrophotographic image forming apparatus according to an embodiment of the present invention.

On the other hand, the main assembly 14 of the image forming apparatus is provided with main assembly coupling means. The main assembly coupling means includes the female coupling shaft 39b (circular column configuration) at a position in alignment with the photosensitive drum rotation axis when the process cartridge B is inserted. The female coupling shaft 39b is a driving shaft integral with the large diameter gear 43 for transmitting the driving force from the motor 61 to the photosensitive drum 7, as shown in FIG. 18. The female shaft 39b is projected from a lateral edge of the gear 43 at a rotation center of the gear 43 (FIG. 19, 20). In this example, the large diameter gear 43 and the female coupling shaft 39b are integrally molded.

The gear 43 in the main assembly side is a helical gear. Each tooth thereof has such an inclination angle that a thrust is produced in the direction of moving the female shaft 39b toward the male shaft 37 when the driving force is transmitted thereto from the helical gear 62 fixed to the shaft 61a of the motor 61. Therefore, when the motor 61 is driven upon image formation, the thrust is effective to move the female shaft 39b toward the male shaft 37 to establish firm coupling between the recess 39a and the projection 37a. The recess 39a is provided at the rotation center of the female shaft 39b at and end of the female shaft 39b.

In this embodiment, the driving force is transmitted directly from the gear 62 fixed to the motor shaft 61a to the gear 43, a gear train may be used for deceleration and driving transmission, or the use may be made of a belt and pulley, a pair of friction rollers or a combination of timing belt and pulley.

Figure 21:
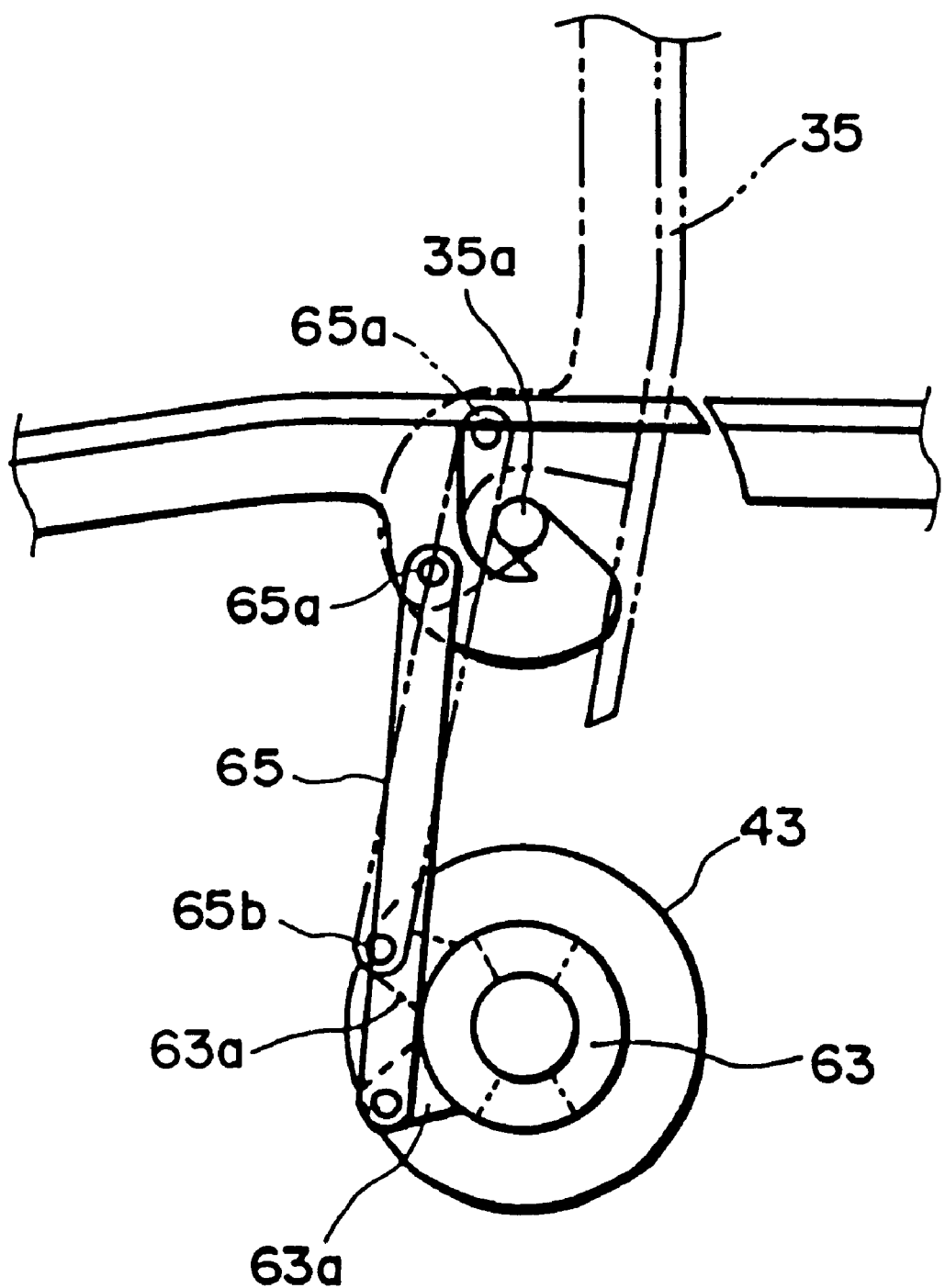
FIG. 21 is a sectional view of a cover of a main assembly of an apparatus and a shaft coupling portion.
Figure 22:
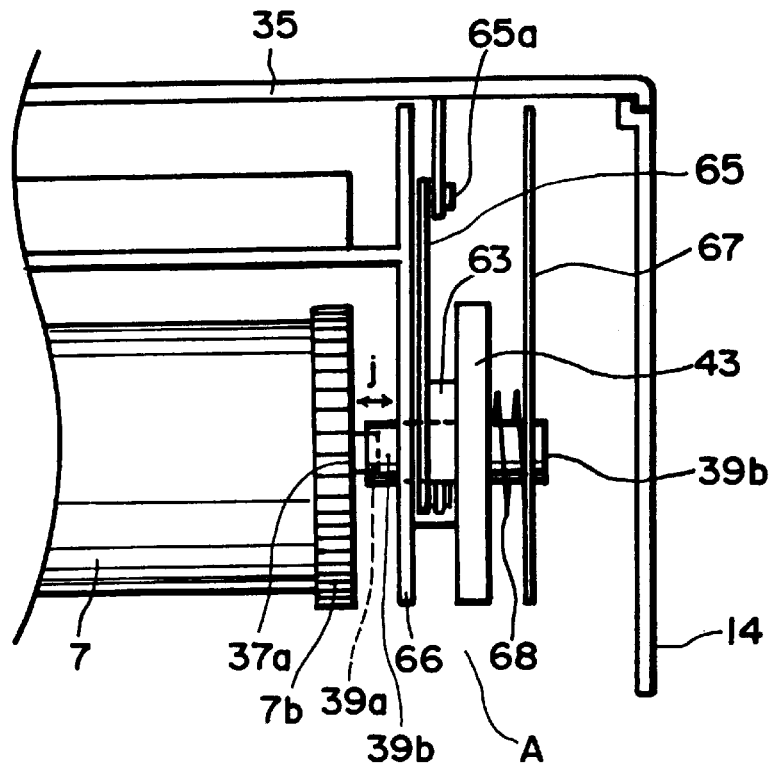
FIG. 22 is a side view around a female coupling shaft when a process cartridge is driven.
Figure 23:
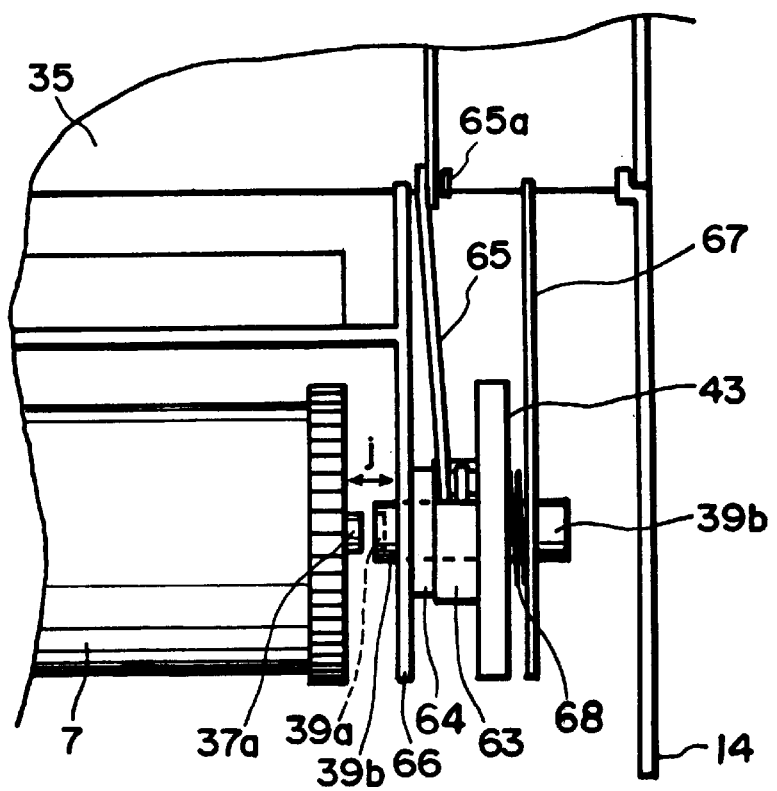
FIG. 23 is a side view of a structure around a female coupling shaft when mounting-and-demounting of the process cartridge is mounted or demounted.

Referring to FIG. 21 to FIG. 23, a description will be made as to a structure for engaging the recess 39a and the projection 37a in interrelation with the closing operation of the openable cover 35.

As shown in FIG. 23, the large gear 43 is between the side plate 67 and the side plate 66 in the main assembly 14, and the female coupling shaft 39b coaxially integral with the large gear 43 is rotatably supported by the side plates 66, 67. An outer cam 63 and an inner cam 64 are closely inserted between the large gear 43 and the side plate 66. The inner cam 64 is fixed to the side plate 66, and the outer cam 63 is rotatably engaged with the female coupling shaft 39b. The surfaces of the outer cam 63 and the inner cam 64 which are substantially perpendicular to the axial direction and which are faced to each other, are cam surfaces, and are screw surfaces coaxial with the female coupling shaft 39b and are contacted to each other. Between the large gear 43 and the side plate 67, a compression coil spring 68 is compressed and fitted around the female coupling shaft 39b.

As shown in FIG. 21, an arm 63a is extended from an outer periphery of the outer cam 63 in a radial direction, and an end of the arm 63a is coupled with an end of a link 65 by a pin 65b at a position opposite from the openable cover 35. The other end of the link 65 is coupled to the cover 35 by a pin 65a.

FIG. 22 is a view as seen from the right in FIG. 21, and when the openable cover 35 is closed, the link 65, outer cam 63 and the like are at the positions shown in the Figure, where the male coupling projection 37a and the recess 39a are engaged so that driving force can be transmitted from the large gear 43 to the photosensitive drum 7. When the openable cover 35 is opened, the pin 65a is rotated upward about the fulcrum 35a, so that arm 63a is pulled up through the link 65, and the outer cam 63 is rotated; thus, relative sliding motion is caused between the outer cam 63 and the inner cam 64 to move the large gear 43 away from the photosensitive drum 7. At this time, the large gear 43 is pushed by the outer cam 63, and is moved against the compression coil spring 68 mounted between the side plate 67 and the large gear 43, by which the female coupling recess 39a is disengaged from the male coupling projection 37a as shown in FIG. 23 to release the coupling to bring the process cartridge B into demountable state.

On the contrary, when the openable cover 35 is closed, the pin 65a connecting the link 65 with the openable cover 35, is rotated downward about the fulcrum 35a, and the link 65 is moved downward to push the arm 63a down, so that outer cam 63 is rotated in the opposite direction, by which the large gear 43 is moved to the left by the spring 68 to a position shown in FIG. 22, so that large gear 43 is set again at a position of FIG. 22, and the female coupling recess 39a is engaged with the male coupling projection 37a to re-establish a drive transmittable state. Thus, the demountable state and the drive transmittable state of the process cartridge B are established in response to opening and closing of the openable cover 35. When the outer cam 63 is rotated in the opposite direction by the closing of the openable cover 35 to move the large gear 43 to the left from the position of FIG. 23, the female coupling shaft 39b and the end surface of the male coupling shaft 37 may be abutted to each other so that male coupling projection 37a and the female coupling recess 39a may not be engaged with each other. However, they will be brought into engagement as soon as starting of the image forming apparatus A, as will be described hereinafter.

Thus, in this embodiment, as the process cartridge B is mounted to or demounted from the main assembly 14 of the apparatus, the openable cover 35 is opened. In interrelation with the opening and closing of the openable cover 35, the female coupling recess 39a is moved in the horizontal direction (the direction of arrow j). As the process cartridge B is mounted to or demounted from the main assembly 14, the coupling (37a, 39a) of the main assembly 14 and the process cartridge B are not to be engaged. And, they should not be engaged. Thus, the mounting-and-demounting of the process cartridge B relative to the main assembly 14 can be carried out smoothly. In this example, the female coupling recess 39a is urged toward the process cartridge B by the large gear 43 being urged by the compression coil spring 68. When the male coupling projection 37a and the recess 39a are to be brought into engagement, they may abut each other, and therefore, not properly engaged. When, however, the motor 61 is first rotated after the process cartridge B is mounted to the main assembly 14, the female coupling recess 39a is rotated, by which they are permitted to be instantaneously brought into engagement.

A description will now be made as to the configurations of the projection 37a and the recess 39a constituting the engaging portion of the coupling means.

The female coupling shaft 39b provided in the main assembly 14 is movable in the axial direction, as described hereinbefore, but it not movable in the radial direction. The process cartridge B is movable in its longitudinal direction when it is mounted in the main assembly. In the longitudinal direction, the process cartridge B is permitted to move between the guiding members 16R, 16L provided in the cartridge mounting space S. When the process cartridge B is movable in the longitudinal direction, the photosensitive drum 7 may be movable or not movable in the longitudinal direction relative to the cartridge frame. The process cartridge B may be mounted so as not to be movable in the longitudinal direction relative to the main assembly 14 of the apparatus, and in such a case, the photosensitive drum 7 is made movable in the longitudinal direction of the cartridge frame.

When the process cartridge B is mounted to the main assembly 14, the cylindrical guide 13aL, concentrically integral with the drum shaft 7a (FIG. 11) with which the drum flange 34 mounted to the end of the photosensitive drum 7 is engaged, is positioned by being fitted into the positioning groove 16b (FIG. 9) of the main assembly 14 without gap, and a spur gear 7n, integrally molded with the drum flange 34, is engaged with a gear (unshown) for transmitting the driving force to the transfer roller 4. On the other hand, at the other end of the photosensitive drum 7, the boss 38a of the cleaning frame 13 is engaged with the positioning groove 16d of the main assembly 14 and positioned. As described in the foregoing, by the openable member 35 being closed, recess 39a moves horizontally to enter the projection 37a.

Then, at the driving side (coupling side), the positioning and the drive transmission are carried out as follows.

Figure 20:
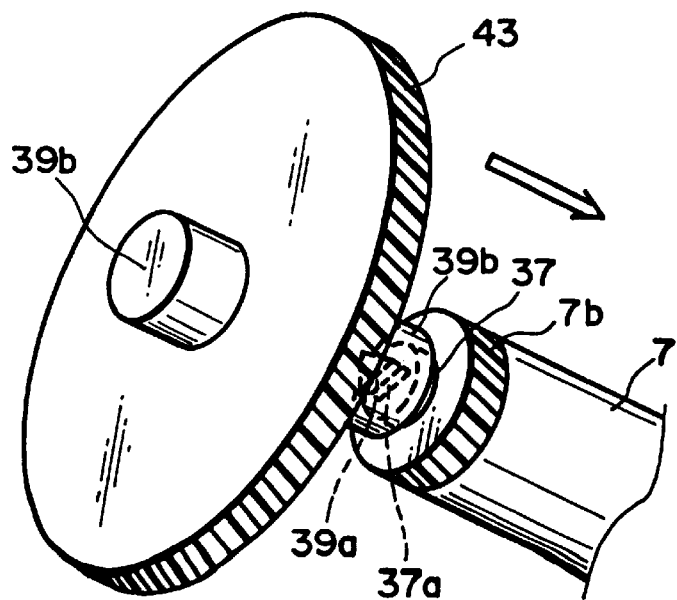
FIG. 20 is a perspective view of a shaft coupling member provided in a main assembly of an apparatus and a shaft coupling member provided in a process cartridge, according to an embodiment of the present invention.

When the driving motor 61 of the main assembly 14 is rotated, the female coupling shaft 39b is moved toward the male coupling shaft 37 (the direction opposite from the direction of the arrow in FIG. 19), and when the phase alignment is reached between the male coupling projection 37a and the recess 39a (in this embodiment, the projection 37a and the recess 39a have substantially equilateral triangle configurations, the phase alignment is reach at each 120 degrees of rotation), they are brought into engagement, so that rotating force is transmitted to the process cartridge B from the main assembly 14 (from the state shown in FIG. 19 to the state shown in FIG. 20).

The sizes of the equilateral triangles of the male coupling projection 37a and the recess 39a are different; more particularly, the cross-section of the triangular recess of the female coupling recess 39a is larger than the cross-section of the triangular projection of the male coupling projection 37a, and therefore, they are smoothly bought into engagement (FIG. 24(a), (b)).

Referring to FIG. 24, during an image forming operation, as the female type coupler shaft 39b rotates in an image forming apparatus, with the coupling projection 37a being in the coupling recess 39a, the inward surface 39a1 of the coupling recess 39a and the edge 37a1 of the coupling projection 37a in form of a substantially equilateral trigonal prism come in contact with each other, whereby the driving force is transmitted. Then, the coupling recess 39a and the coupling projection 37a move in the direction to cause the rotational axis X1 of the coupling projection 37a and the rotational axis X2 of the coupling recess 39a to align with each other.

In this embodiment, when the rotational axes of the coupling means members on the process cartridge B side and the apparatus main assembly 14 side automatically align with each other, the process cartridge B is moved in the downward direction, which is substantially perpendicular to the axial line of the photosensitive drum 7. During this movement of the process cartridge B, the outward surface of the cylindrical boss 38a of the process cartridge B, as a process cartridge positioning member, comes in contact with a projection 50 of the guide 16, as a cartridge positioning member on the apparatus main assembly 14 side, so that the process cartridge B is prevented from being moved downward more than a predetermined distance (FIGS. 27–35).

On the other hand, the coupling projection 37a is in the form of a twisted polygonal prism having twisted edges 37a1 as contact edges, and the coupling recess 39a is in the form of a twisted polygonal prism having twisted inward surfaces 39a1 as contact surfaces. Therefore, as driving force is delivered after the coupling means is engaged, thrust is generated in the axial direction at the contact points (lines) between the edges 37a1 of the coupling projection 37a and the corresponding inward surfaces 39a1 of the coupling recess 39a. More specifically, due to the direction of the twist given to the coupling projection 37a and the coupling recess 39a, the thrust is generated in the direction to cause the coupling recess 39a to draw the coupling projection 37a into the recess 39a. Therefore, the end surface 37a2 of the coupling projection 37a comes in contact with the bottom surface 39a2 of the coupling recess 39a, provided that the photosensitive drum 7 is supported by the cleaning chamber frame 13 of the process cartridge B so that the process cartridge B is allowed to move in the axial direction thereof, as illustrated in FIG. 11. As a result, the position of the photosensitive drum 7 in terms of the lengthwise direction thereof is fixed.

In some cases, in order to fix the position of the process cartridge B in the apparatus main assembly 14 in terms of the lengthwise direction thereof, the process cartridge B and the apparatus main assembly 14 are structured so that a side plate, for example, of the cleaning chamber frame 13 comes in contact with the installation guide 16R as the process cartridge B is inserted into the apparatus main assembly 14. In such cases, in order to prevent the coupling projection 37a from being moved, in the axial direction thereof, into the coupling recess 39a, more specifically, in order to prevent the end surface 37a2 of the coupling projection 37a from coming in contact with the bottom surface 39a2 of the coupling recess 39a, the structures may be modified so that the outward surface 7b1 of the drum gear 7b of the drum flange 36 comes in contact with the inward brim 38b of the bearing 38.

When the photosensitive drum 7 is attached to the cartridge frame so that the photosensitive drum 7 does not move in the axial direction thereof, the process cartridge B is enabled to move relative to the apparatus main assembly 14 in the axial direction, and the position of the photosensitive drum 7 in terms of the lengthwise direction thereof becomes fixed as the end surface 37a2 of the coupling projection 37a is placed in contact with the bottom surface 39a2 of the coupling recess 39a by the thrust generated as the male type coupler shaft 37 is driven by the female type coupler shaft 39b. In this case, the position of the process cartridge B in terms of the lengthwise direction thereof is fixed as the process cartridge B comes in contact with the guide member 16R on the driving side. As for the force which is necessary to move the process cartridge B and press it against the driving side guide member 16R, the thrust generated as the coupling recess 39a rotatively drives the coupling projection 37a may be employed. In such a case, however, the structures of the process cartridge B and the apparatus main assembly 14 must be such that the process cartridge B comes in contact with the guide member 16R before the end surface 37a2 of the coupling projection 37a comes in contact with the bottom surface 39a2 of the coupling recess 39a.

In the preceding embodiment, the coupling projection 37a and the coupling recess 39a are in the form of a twisted polygonal prism, and the direction of their twist is such that the female type coupler shaft 39b and male type coupler shaft 37 pull each other in the axial direction. However, the direction of the twist may be reversed so that the photosensitive drum 7 is thrust toward the nondriven side. In such a case, the inward surface of the side wall of the cartridge space in the apparatus main assembly 14, on the non-driving side, must be used as the referential surface for fixing the position of the process cartridge B in terms of the lengthwise direction thereof.

With the provision of the above-described structures, the boss 38a on the process cartridge B side comes in contact with the projection 50 of the guide 16 on the apparatus main assembly 14 side, and as a result, the position of the process cartridge B relative to the apparatus main assembly 14 in terms of the direction substantially perpendicular to the axial line of the photosensitive drum 7 is fixed. Further, as driving force is transmitted to the photosensitive drum 7, moment is generated in the process cartridge B, and this moment increases the contact pressure between a rotation control surface area 13j (FIGS. 4–6) and a rotational control projection 25 (FIGS. 9 and 10). The rotational control surface area 13j is a small surface area which is located on the top side of the process cartridge B, and is parallel to the lengthwise direction of the process cartridge B. The rotation control projection 25 is fixed to the apparatus main assembly 14.

While not being driven (not in an image forming operation), a gap is created between the coupling projection 37a and the coupling recess 39a in the radial direction, making it easier for the coupling projection 37a and coupling recess 39a to engage with, or discharge from, each other. While being driven (in an image forming operation), the contact between the coupling projection 37a and the coupling recess 39a is stabilized, and therefore, the loosening or vibration which might occur otherwise can be prevented. Further, the contact between the cartridge positioning boss 38a of the process cartridge B and the cartridge positioning projection 50 of the apparatus main assembly 14 controls the vibration of the process cartridge B. It should be noted here that in this embodiment, the rotational axes of the coupling recess 39a and the coupling projection 37a will have been, or will not have been, perfectly aligned before the cartridge positioning portions 50 and 38a on the apparatus main assembly 14 side and the process cartridge B side, respectively, come in contact with each other. However, obviously, even if the coupling recess 39a and coupling projection 37a are not perfectly aligned, the aligning error will be small enough to provide acceptable image quality from a practical point of view.

Although the configuration of the coupling projection 37a and the coupling recess 39a in this embodiment is substantially equilaterally trigonal, an equilaterally polygonal configuration provides the same effects, which is obvious. Further, when the configuration is substantially equilaterally polygonal, positioning can be more accurate. However, the configuration does not need to be limited to those equilaterally polygonal; any polygonal configuration may be used as long as it can cause the coupling recess 39a and coupling projection 37a to draw each other.

In comparing the coupling projection 37a and coupling recess 39a, the former is easily damaged due to its configuration; the former is inferior in strength. In this embodiment, therefore, the process cartridge B, which is replaceable, is provided with the coupling projection 37a, and the apparatus main assembly 14, which is required to be more durable, is provided with the coupling recess 39a.

The essential features of the process cartridge B described in the preceding embodiments can be summarized as follows. The process cartridge B is removably installable in the main assembly 14 of an electrophotographic image forming apparatus A, which forms images on a recording medium 2, and comprises: the motor 61; the large gear 43 which transmits the driving force from the motor 61; and the coupling recess 39*a* which is in the form of a twisted polygonal prism, is located at the end of a shaft extending from the center of the large gear 43, and rotates with the large gear 43. The process cartridge B comprises: the electrophotographic photosensitive drum 7; processing means (charge roller 8, development roller 9*c*, and cleaning blade 10*a*) which acts on the electrophotographic photosensitive drum 7; and the coupling projection 37*a* which is in the form of a twisted polygonal prism, and engages with the coupling recess 39*a*, the surface of the coupling projection 37*a* coming in contact with the inward surface of the coupling recess 39*a*, wherein as the process cartridge B is installed in the apparatus main assembly 14, and the large gear 43 on the apparatus main assembly 14 side rotates, the coupling projection 37*a* being fitted in the coupling recess 39*a*, the rotational force is transmitted from the large gear 43 on the apparatus main assembly 14 side to the photosensitive drum 7 while generating thrust in the direction to cause the coupling projection 37*a* to be drawn into the coupling recess 39*a*.

The positioning of the process cartridge B relative to the apparatus main assembly 14, which occurs in an image forming operation (when driving force is transmitted), can be summarized as follows.

First, the position of the process cartridge B is fixed as the cylindrical guides 13*a*R and 13*a*L perfectly fit in the positioning grooves 16*d* and 16*b*. When in an image forming operation (while driving force is transmitted), the position of the process cartridge B in terms of the lengthwise direction thereof is fixed as the coupling projection 37*a* on the process cartridge B side is drawn into the coupling recess 39*a* on the apparatus main assembly 14 side. In this embodiment of the present invention, the photosensitive drum 7 is rendered movable (approximately 0.1 mm–1.0 mm) in the lengthwise direction thereof in consideration of assembly error. Therefore, as the coupling projection 37*a* is drawn into the coupling recess 39*a*, the outward surface 7*b*1 (FIG. 11) of the drum flange 36 comes in contact with the inward brim 38*b* of the bearing 38. Also in consideration of assembly error, the process cartridge B is rendered movable (approximately 0.1 mm–3.0 mm) relative to the side plate (installation guides 16*a* and 16*c*). Therefore, as the driving force is transmitted, the process cartridge B is drawn in the lengthwise direction of the photosensitive drum 7 (moved substantially in the horizontal direction). It should be noted here that when the outward surface 7*b*1 of the drum flange 36 is already in contact with the inward brim 38*b* of the bearing 38 before the transmission of the driving force begins, or when the photosensitive drum 7 is given substantially no play in the axial direction, the process cartridge B is drawn in the lengthwise direction of the photosensitive drum 7 (moved substantially in the horizontal direction) as soon as the driving force is transmitted.

During an image forming operation, the process cartridge B is subjected to such force that works in the direction to rotate the process cartridge B in the rotational direction of the photosensitive drum 7, and this force increases the contact pressure between the rotation control surface area 13*j* of the process cartridge B and the rotation control projection 25 fixed to the apparatus main assembly 14.

When there is a sufficient play to allow the photosensitive drum 7 and/or the cleaning chamber frame 13 to move in the lengthwise direction thereof, the position of the photosensitive drum 7 in terms of the lengthwise direction thereof is fixed as the end surface 37*a*2 of the coupling projection 37*a* and the bottom surface 39*a*2 of the coupling recess 39*a* come in contact with each other.

Figure 25:
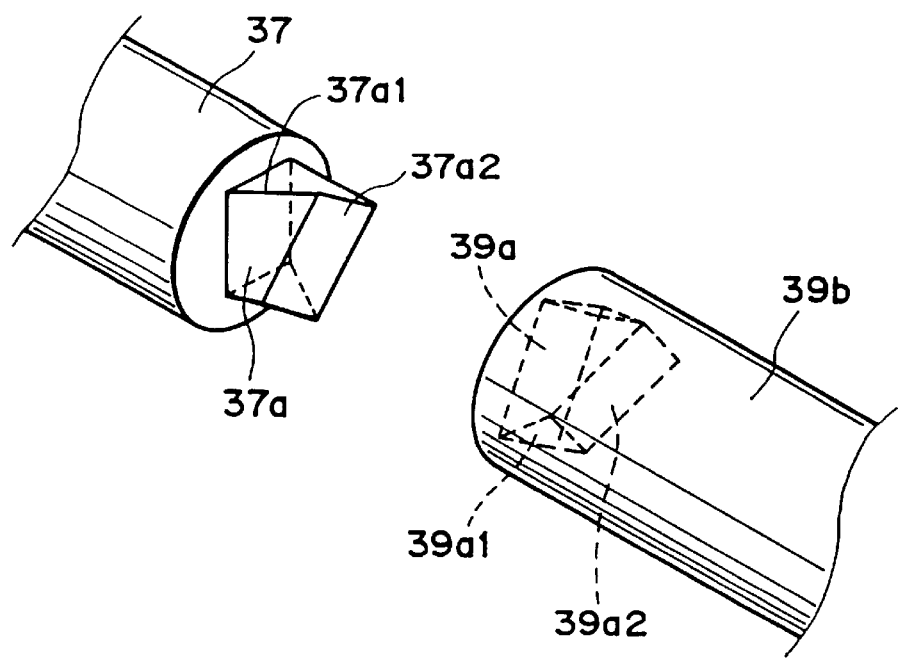
FIG. 25 is a perspective view of a shaft coupling according to an embodiment of the present invention.

Next, referring to FIG. 25, another embodiment of the present invention will be described regarding the configuration of the coupling projection 37*a* of the male type coupler shaft 37 and the positioning of the process cartridge B relative to the apparatus main assembly 14. Since the basic structures of the process cartridge B and the image forming apparatus A in this embodiment are the same as those described in the first embodiment, the portions which are the same in function as those in the first embodiment are designated with the same referential figures.

The coupling projection 37*a* in this embodiment is in the form of a twisted square prism, and the coupling recess 39*a* which engages with the coupling projection 37*a* is also in the form of a twisted square prism. As for the direction of the twist, the coupling projection 37*a* is twisted in the direction opposite to the rotational direction thereof as seen from the lengthwise center of the photosensitive drum 7, looking toward the end portion of the photosensitive drum 7, and the coupling recess 39*a* is twisted in the direction opposite to the rotational direction thereof as seen from the photosensitive drum 7 side looking toward the outside of the apparatus main assembly 14. As the coupling projection 37*a* on the process cartridge B side engages with the coupling recess 39*a* on the apparatus main assembly 14 side, and the rotational force on the coupling recess 39*a* side begins to be transmitted to the coupling projection 37*a*, each edge 37*a*1 of the coupling projection 37*a* makes contact with one of the inward surfaces of the coupling recess 39*a*, leaving substantially no gap between them, and therefore, the driving force is stably transmitted. Further, since the surface of both the coupling projection 37*a* and the coupling recess 39*a* are twisted in the aforementioned direction, thrust is generated in the direction to draw the coupling projection 37*a* and the coupling recess 39*a* to each other, causing the end surface 37*a*2 of the coupling projection 37*a* and the bottom surface 39*a*2 of the coupling recess 39*a* to come in contact with each other. As a result, the position of the process cartridge B relative to the apparatus main assembly 14 in the axial direction of the process cartridge B is fixed.

Figure 26:
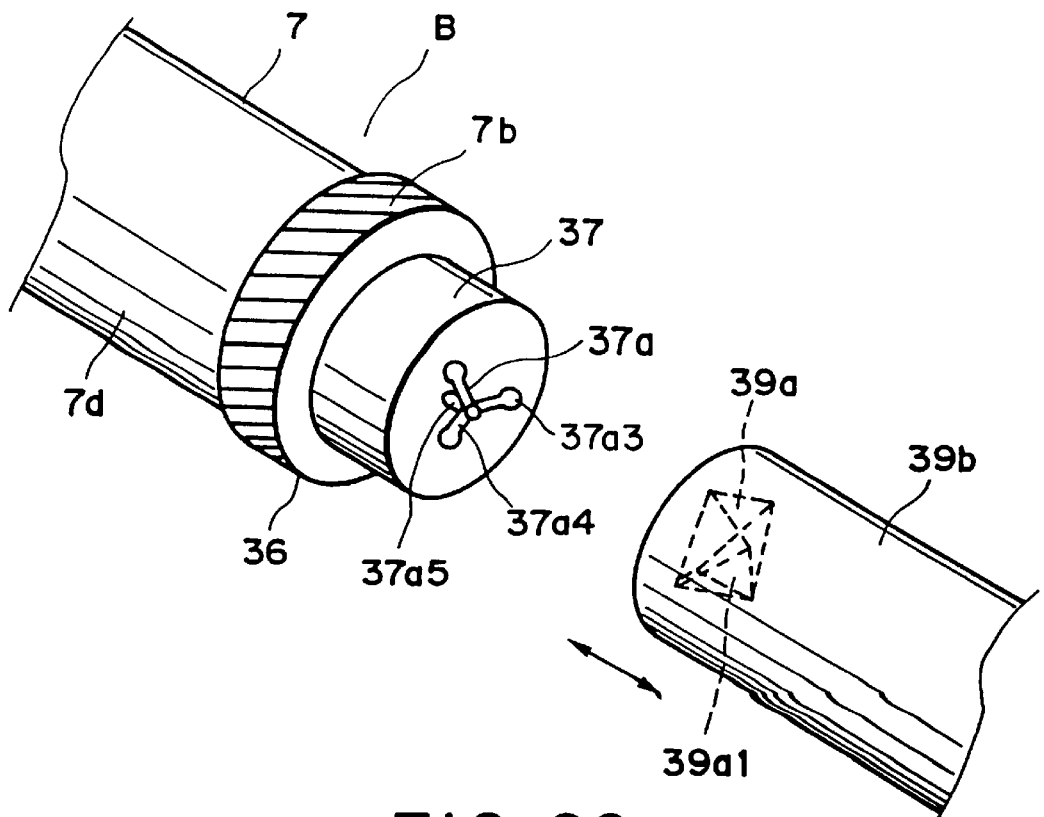
FIG. 26 is a perspective view of a shaft coupling according to an embodiment of the present invention.

Although the coupling projection 37*a* and the coupling recess 39*a* in this embodiment are in the form of a twisted prism, their configuration does not need to be limited to this; they may be in the form of a polygonal prism different from the one in this embodiment. For example, they may be shaped like those illustrated in FIG. 26 as long as they generates thrust in the axial direction thereof. Referring to FIG. 26, the coupling projection 37*a* is constituted of a support shaft 37*a*5, which projects from the center of the end surface of the male type coupler shaft 37 in the axial direction thereof, and a plurality (three) of arms 37*a*4, which radially extend from the end of the support shaft 37*a*5 in the direction perpendicular to the support shaft 37*a*5, and a plurality (three) of substantially spherical contact portions 37*a*3, which are attached, one for one, to the ends of the radial arms 37*a*4, and each of which comes in contact with one of the inward surfaces 39*a*1 of the coupling recess 39*a*.

Figure 27:
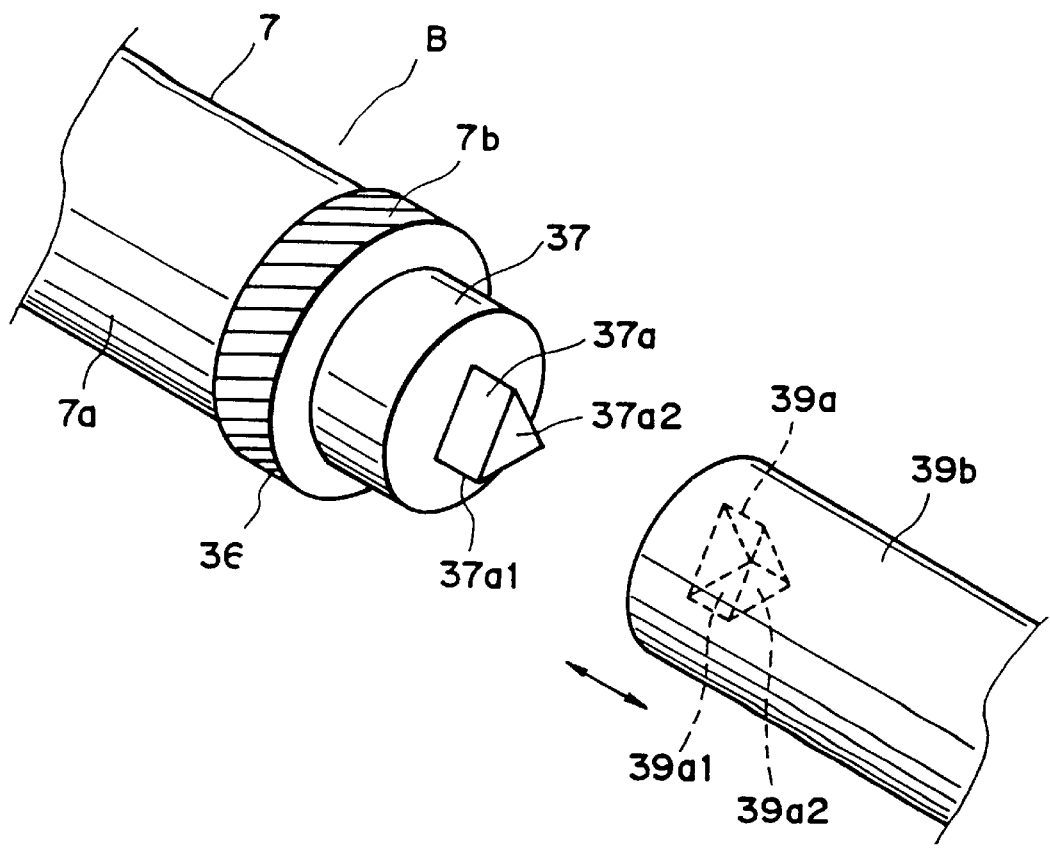
FIG. 27 is a perspective view of a shaft coupling according to an embodiment of the present invention.

In this embodiment, the coupling means on the driven side, that is, the coupling projection 37*a*, and the coupling means on the driving side, that is, the coupling recess 39*a*, are both provided with twisted surfaces. However, the structure of the coupling means may be such that only one side of the coupling means is provided with twisted surfaces, or neither side is provided with twisted surfaces as shown in FIG. 27.

As is evident from the above description, the present invention can be embodied in various forms.

The positioning of the photosensitive drum 7 in terms of the lengthwise direction thereof may be summarized as follows. First, the coupling means is constituted of two members, one on the driving side, that is, the female type coupler shaft 39*b* with the coupling recess 39*a*, which transmits the rotational force from the apparatus main assembly 14 side to the process cartridge B, and the other on the driven side, that is, the male type coupler shaft 37 with the coupling projection 37*a*, which receives the rotational force, wherein as the coupling recess 39*a* engages with the coupling projection 37*a*: (1) the female type coupler shaft 39*b* remains at a predetermined location on the axial line thereof, and the coupling recess 39*a* of the female type coupler shaft 39*b* draws the coupling projection 37*a* into the coupling recess 39 in the axial direction thereof, or (2) the female type coupler shaft 39*b* remains at a predetermined location on the axial line, and the coupling recess 39*a* of the female type coupler shaft 39*b* pushes away the coupling means member on the driven side (male type coupler shaft 37 with the coupling projection 37*a*) in the axial direction.

Next, as for the photosensitive drum 7 itself, it may be supported by the cleaning chamber frame 13 in two different manners: (1) it may be supported so that it is movable relative to the cleaning chamber frame 13 in the lengthwise direction, or (2) it may be supported so that it is immovable relative to the cleaning chamber frame 13 in the axial direction.

As for the cartridge frame of the process cartridge B, more specifically, the cleaning chamber frame 13 which supports the photosensitive drum 7, it may be installed in the cartridge space in the apparatus main assembly 14 in two different manners: (1) the process cartridge B may be installed in the cartridge space in the apparatus main assembly 14 so that the cleaning chamber frame 13 is movable in the lengthwise direction thereof, or (2) the process cartridge B may be installed in the cartridge space in the apparatus main assembly 14 so that the cleaning chamber frame 13 is immovable relative to the cartridge installation guide in the lengthwise direction thereof.

Each of the arrangements, in which the photosensitive drum 7 is attached in the cleaning chamber frame 13, or the process cartridge B is installed in the apparatus main assembly 14, may be employed in combination, except for the arrangement in which the process cartridge B is installed in the apparatus main assembly 14 so that the photosensitive drum 7 is rendered immovable in the lengthwise direction thereof relative to the cartridge installation guide 16.

Next, the preceding embodiments will be described in more detail with reference to the drawings. The drawings, which will be referred to in the following description, schematically depict the coupling means members, the process cartridge B, and the cartridge installation space and the adjacencies thereof in the apparatus main assembly 14.

In the preceding embodiments, when the designs of the process cartridge B and the apparatus main assembly 14 are such that the photosensitive drum 7 is moved toward the nondriven side, the movement of the photosensitive drum 7 relative to the drum shaft 7*a* in the axial direction is prevented by the stepped portion 7*a*3 of the drum shaft 7*a*, which is fixed to the cleaning chamber frame 13. Thus, in the following description, the movement of the photosensitive drum 7 in the axial direction thereof will be described as the relationship between the photosensitive drum 7 and the cleaning chamber frame 13, because the movement of the photosensitive drum 7 in the axial direction thereof is ultimately regulated by the cleaning chamber frame 13.

Figure 28:
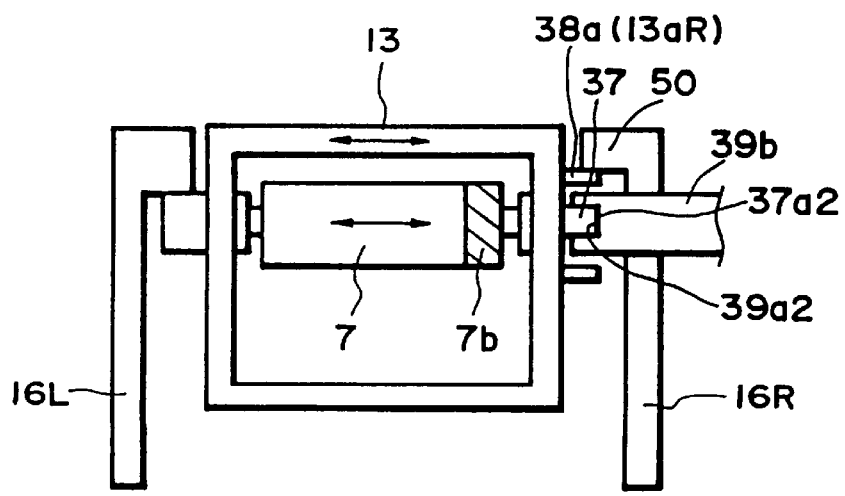
FIG. 28 is a schematic plan view showing a relation in the longitudinal direction among a photosensitive drum, a process cartridge, a main assembly of an apparatus and a shaft coupling.

In the case of the arrangement depicted in FIG. 28, the photosensitive drum 7 is supported by the cleaning chamber frame 13 so that it can be moved in the lengthwise direction thereof relative to the cleaning chamber frame 13, wherein the cleaning chamber frame 13 is movable in the lengthwise direction thereof between the guide members 16. In this case, as the coupling means is engaged, the male type coupler shaft 37 is drawn toward the female type coupler shaft 39*b*, and as a result, the end surface 37*a*2 of the coupling projection 37*a* comes in contact with the bottom surface 39*a*2 of the coupling recess 39*a*. Consequently, the position of the photosensitive drum 7 in terms of the axial direction is fixed.

Figure 29:
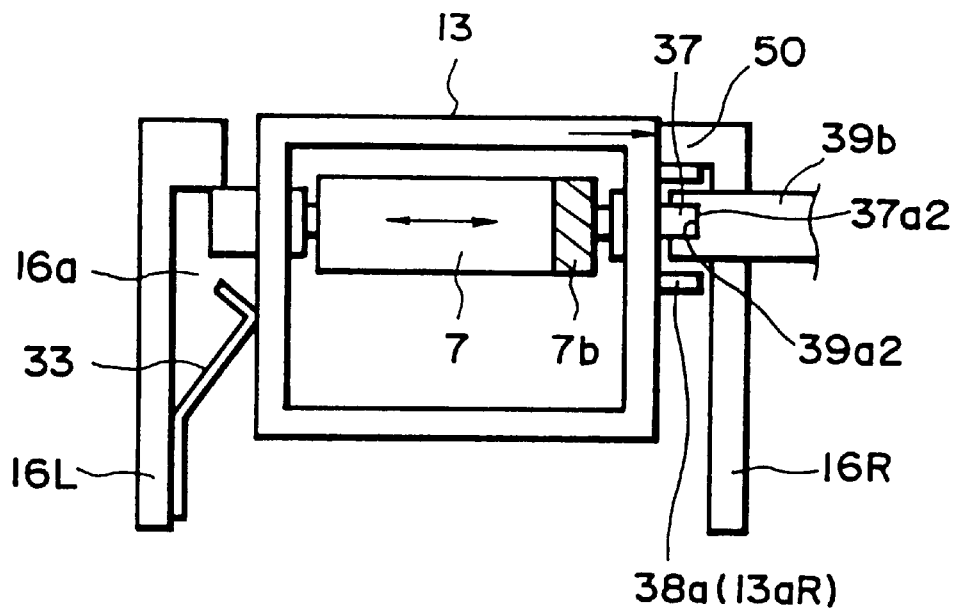
FIG. 29 is a schematic plan view showing a relation in the longitudinal direction among a photosensitive drum, a process cartridge, a main assembly of an apparatus and a shaft coupling.

In the case of the arrangement depicted in FIG. 29, the photosensitive drum 7 is supported by the cleaning chamber frame 13 so that the photosensitive drum 7 can be moved in the lengthwise direction thereof relative to the cleaning chamber frame 13, wherein the cleaning chamber frame 13 is regulated by a plate spring 33 disposed between the bottom portion of the guide portion 16*a* and the side wall of the cleaning chamber frame 13, being prevented from moving in the lengthwise direction in the cartridge installation space in the apparatus main assembly 14. In this case, as the coupling means is engaged, the male type coupler shaft 37 is drawn toward the female type coupler shaft 39*b*, and as a result, the end surface 37*a*2 of the coupling projection 37*a* comes in contact with the bottom surface 39*a*2 of the coupling recess 39*a*, fixing the position of the photosensitive drum 7 in terms of the lengthwise direction. Also in the case of an arrangement in which the process cartridge B is rendered immovable in the lengthwise direction thereof relative to the apparatus main assembly 14 by placing the cleaning chamber frame 13 between the two guide members 16, leaving no play, instead of employing the plate spring 33, the position of the photosensitive drum 7 is fixed in the same manner as is in the case of the arrangement depicted in FIG. 29.

Figure 30:
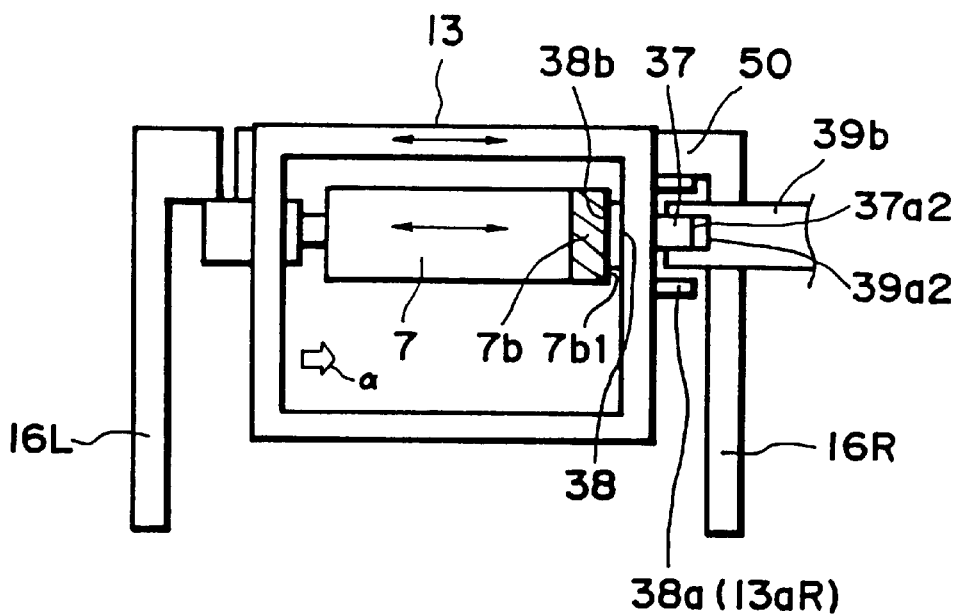
FIG. 30 is a schematic plan view showing a relation in the longitudinal direction among a photosensitive drum, a process cartridge, a main assembly of an apparatus and a shaft coupling.

In the case of the arrangement depicted in FIG. 30, the photosensitive drum 7 is supported by the cleaning chamber frame 13 so that it can be moved in the lengthwise direction relative to the cleaning chamber frame 13, wherein the cleaning chamber frame 13 is movable in the lengthwise direction thereof between the guide members 16. Also in this case, as the coupling means is engaged, the male type coupler shaft 37 is drawn toward the female type coupler shaft 39*b*. However, before the end surface 37*a*2 of the coupling projection 37*a* comes in contact with the bottom surface 39*a*2 of the coupling recess 39*a*, the photosensitive drum 7 comes in contact with the bearing 38. More specifically, the end surface 7*b*1 of the aforementioned 36 comes in contact with the brim 38*b* of the bearing 38, whereby the position of the photosensitive drum 7 relative to the cleaning chamber frame 13 is fixed. Next, the cleaning chamber frame 13 is moved toward the driven side due to the thrust which draws the photosensitive drum 7 in the direction of arrow mark (a). As a result, the cleaning chamber frame 13 comes in contact with the guide member 16R on the driving side, whereby the position of the cleaning chamber frame 13 in the lengthwise direction thereof relative to the apparatus main assembly 14 is fixed, and consequently, the position of the photosensitive drum 7 in the lengthwise direction thereof relative to the apparatus main assembly 14 is also fixed.

Figure 31:
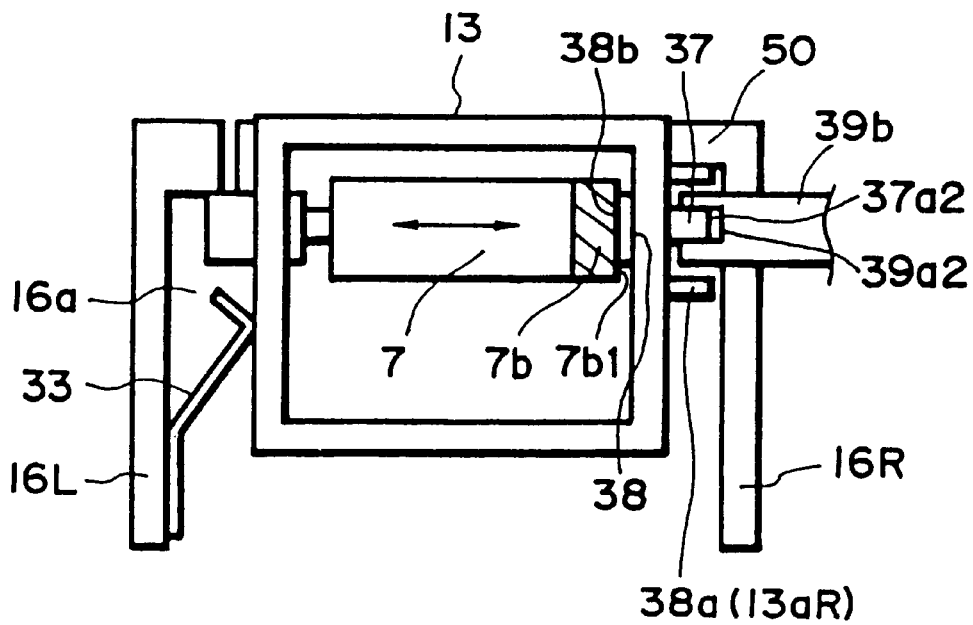
FIG. 31 is a schematic plan view showing a relation in the longitudinal direction among a photosensitive drum, a process cartridge, a main assembly of an apparatus and a shaft coupling.

In the case of an arrangement depicted in FIG. 31, the photosensitive drum 7 is supported by the cleaning chamber frame 13 so that it can be moved in the lengthwise direction thereof relative to the cleaning chamber frame 13, wherein the cleaning chamber frame 13 is regulated by a plate spring 33 disposed between the bottom portion of the guide portion 16*a* and the cleaning chamber frame 13, being prevented from moving in the lengthwise direction thereof in the cartridge space in the apparatus main assembly 14. Also in this case, as the coupling means is engaged, the male type coupler shaft 37 is drawn toward the female type coupler shaft 39b. However, before the end surface 37a2 of the coupling projection 37a comes in contact with the bottom surface 39a2 of the coupling recess 39a, the photosensitive drum 7 comes in contact with the bearing 38. More specifically, the end surface 7b1 of the drum flange 36 comes in contact with the brim 38b of the bearing 38, whereby the position of the photosensitive drum 7 in the lengthwise direction thereof relative to the apparatus main assembly 14 is fixed, because the cleaning chamber frame 13 is immovably installed relative to the apparatus main assembly 14 in terms of the lengthwise direction thereof. Also in the case of an arrangement in which the process cartridge B is rendered immovable in the lengthwise direction thereof relative to the apparatus main assembly 14 by placing the cleaning chamber frame 13 between the two guide members 16, leaving no play, instead of employing the plate spring 33, the position of the photosensitive drum 7 is fixed in the same manner as is in the case of the arrangement depicted in FIG. 31.

Figure 32:
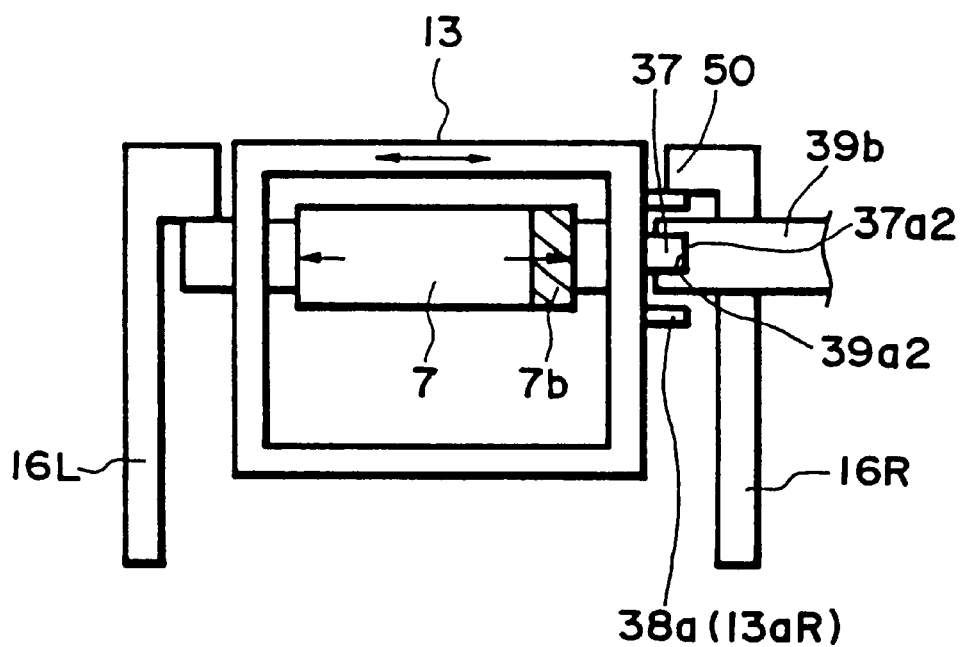
FIG. 32 is a schematic plan view showing a relation in the longitudinal direction among a photosensitive drum, a process cartridge, a main assembly of an apparatus and a shaft coupling.

In the case of the arrangement depicted in FIG. 32, the photosensitive drum 7 is supported by the cleaning chamber frame 13 so that it cannot move in the lengthwise direction thereof relative to the cleaning chamber frame 13, wherein the cleaning chamber frame 13 is rendered movable in the lengthwise direction between the guide members 16. In this case, as the coupling means is engaged, the male type coupler shaft 37 is drawn toward the female type coupler shaft 39b, and consequently, the end surface 37a2 of the coupling projection 37a comes in contact with the bottom surface 39a2 of the coupling recess 39a, whereby the position of the photosensitive drum 7 in the lengthwise thereof is fixed.

Figure 33:
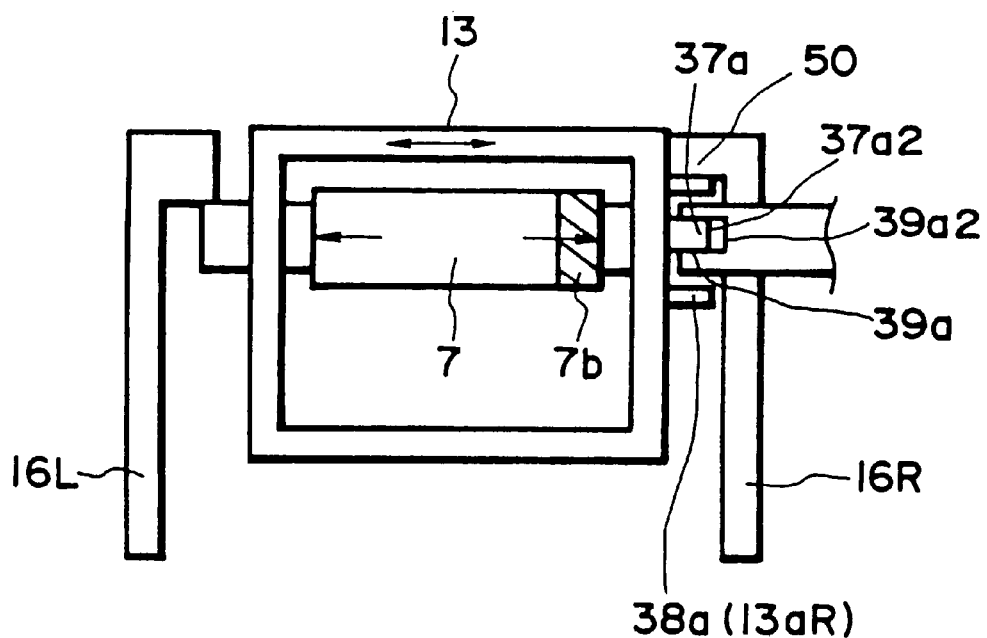
FIG. 33 is a schematic plan view showing a relation in the longitudinal direction among a photosensitive drum, a process cartridge, a main assembly of an apparatus and a shaft coupling.

In the case of the arrangement depicted in FIG. 33, the photosensitive drum 7 is supported by the cleaning chamber frame 13 so that it cannot move in the lengthwise direction thereof relative to the cleaning chamber frame 13, wherein the cleaning chamber frame 13 is rendered movable in the lengthwise direction thereof between the guide members 16. Also in this case, as the coupling means is engaged, the coupling projection 37a, the coupling means member on the driven side, is drawn by the coupling recess 39a. However, before the end surface 37a2 of the coupling projection 37a reaches the bottom surface 39a2 of the coupling recess 39a, the cleaning chamber frame 13 comes in contact with the guide member 16R on the driving side, whereby the position of the photosensitive drum 7 in the lengthwise direction thereof is fixed.

Figure 34:
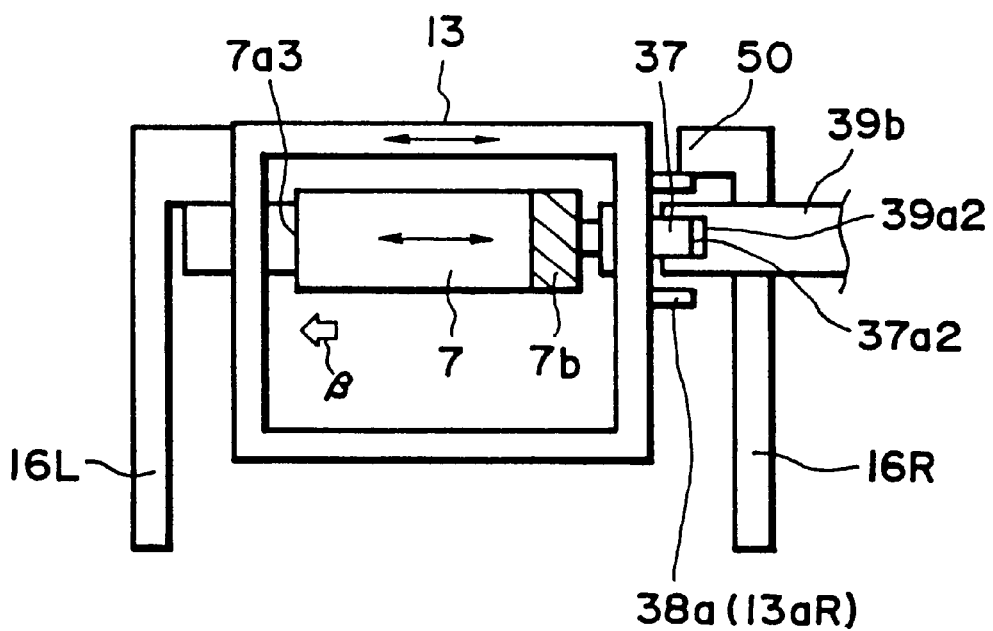
FIG. 34 is a schematic plan view showing a relation in the longitudinal direction among a photosensitive drum, a process cartridge, a main assembly of an apparatus and a shaft coupling.
Figure 35:
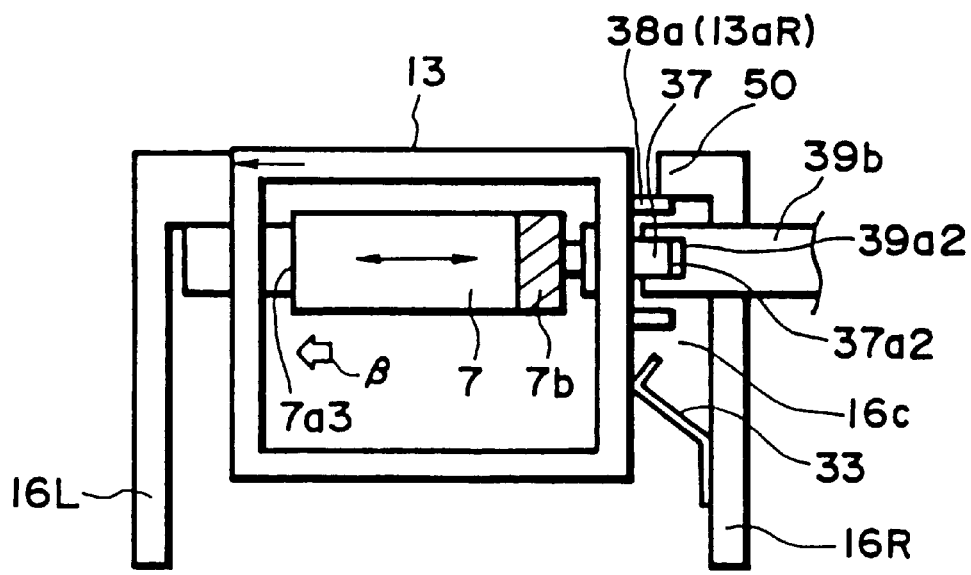
FIG. 35 is a schematic plan view showing a relation in the longitudinal direction among a photosensitive drum, a process cartridge, a main assembly of an apparatus and a shaft coupling.
Figure 36:
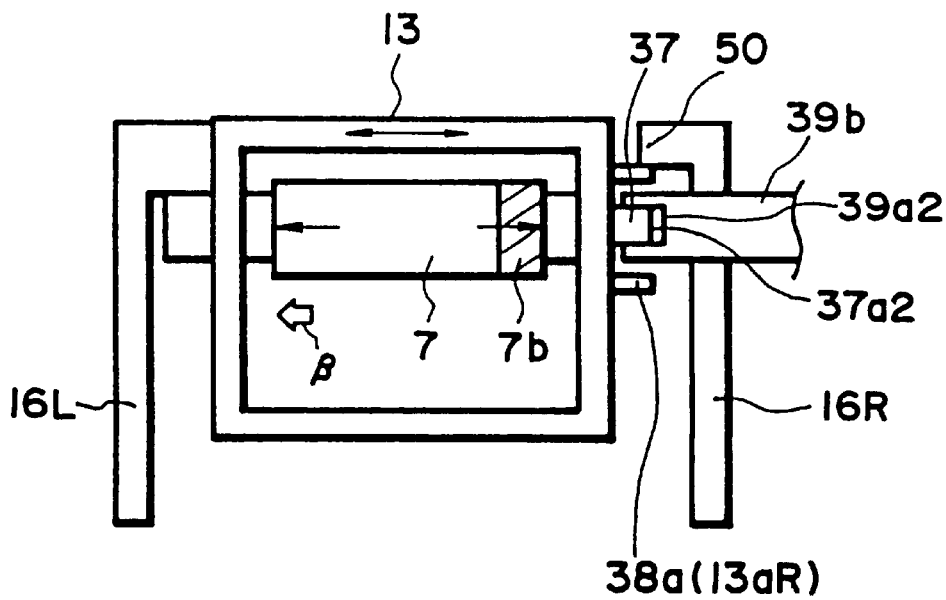
FIG. 36 is a schematic plan view showing a relation in the longitudinal direction among a photosensitive drum, a process cartridge, a main assembly of an apparatus and a shaft coupling.

In the cases of the arrangements depicted in FIGS. 34, 35 and 36, the coupling projection 37a and the coupling recess 39a are twisted in the direction opposite to the direction in which they were twisted in the preceding arrangements. Therefore, as the coupling means is engaged, and driving force is transmitted from the coupling means member on the driving side (female type coupler shaft 39b) to the coupling means member on the driven side (male type coupler shaft 37), the male type coupler shaft 37 is pushed away by the female type coupler shaft 39b toward the nondriven side of the photosensitive drum 7. In other words, in any of these cases, the photosensitive drum 7 is thrust toward the nondriven side thereof (in the direction of arrow B). As a result, the cleaning chamber frame 13 is placed in contact with the guide member 16L on the nondriven side of the photosensitive drum 7 by the photosensitive drum 7, and consequently, the position of the photosensitive drum 7 in the lengthwise direction thereof is fixed.

In the case of the arrangement depicted in FIG. 34, the photosensitive drum 7 is supported by the cleaning chamber frame 13 so that it can be moved in the lengthwise direction thereof relative to the cleaning chamber frame 13, and the cleaning chamber frame 13 is rendered movable in the lengthwise direction thereof between the guide members 16. In this case, as the coupling means is engaged, the male type coupler shaft 37 is pushed away by the female type coupler shaft 39b, and as a result, the surface 7a3 of the drum flange on the nondriven side of the photosensitive drum 7 comes in contact with the side wall of the cleaning chamber frame 13. Consequently, the cleaning chamber frame 13 is pushed by the photosensitive drum 7, being placed in contact with the guide member 16L on the side opposite to the driving side. As a result, the position of the photosensitive drum 7 in the lengthwise direction is fixed.

In the case of the arrangement depicted in FIG. 35, the photosensitive drum 7 is supported by the cleaning chamber frame 13 so that the photosensitive drum 7 can move in the lengthwise direction thereof relative to the cleaning chamber frame 13, and the cleaning chamber frame 13 is regulated by a plate spring 33 disposed between the bottom portion of the guide portion 16c and the cleaning chamber frame 13, being prevented from moving in the lengthwise direction thereof in the cartridge space in the apparatus main assembly 14. In this case, as the coupling means is engaged, the male type coupler shaft 37 is pushed away by the female type coupler shaft 39b, and as a result, the surface 37a3 of the drum flange on the nondriven side of the photosensitive drum 7 comes in contact with the side wall of the cleaning chamber frame 13. Consequently, the position of the photosensitive drum 7 is fixed, because the movement of the cleaning chamber frame 13 is regulated by the plate spring 33 in this case. Also in the case of an arrangement in which the process cartridge B is rendered immovable in the lengthwise direction thereof relative to the apparatus main assembly 14 by placing the cleaning chamber frame 13 between the two guide members 16, leaving no play, instead of employing the plate spring 33, the position of the photosensitive drum 7 is fixed in the same manner as is in the case of the arrangement depicted in FIG. 35.

In the case of the arrangement depicted in FIG. 36, the photosensitive drum 7 is supported by the sealing chamber frame 13 so that the photosensitive drum 7 does not move in the lengthwise direction thereof relative to the cleaning chamber frame 13, whereas the cleaning chamber frame 13 is rendered movable in the lengthwise direction between the guide members 16. In this case, as the coupling means is engaged, the male type coupler shaft 37 is pushed away by the female type coupler shaft 39b. As a result, the photosensitive drum 7 is moved toward the nondriven side thereof while pushing the cleaning chamber frame 13. Consequently, the cleaning chamber frame 13 comes in contact with the guide member 16L on the side opposite to the driving side, whereby the position of the photosensitive drum 7 in terms of the lengthwise direction thereof is fixed.

It should be noted here that in the preceding arrangements, the direction in which the teeth of the helical drum gear 7b for transmitting the rotational force of the photosensitive drum 7 to the development roller 9c are slanted so that the direction of the thrust generated by the contact between the helical drum gear 7b and the gear of the development roller 9c coincides with the direction of the thrust generated by the coupling means as driving force is transmitted from the coupling means member on the driving side to the coupling means member on the driven side, whether the female type coupler shaft 39b draws the male type coupler shaft 37 or pushes it away.

Also in the preceding embodiments, the photosensitive drum 7 and the coupling means member on the process cartridge B side were integrated. However, the present invention is applicable to a coupling means structure in which a photosensitive drum and the coupling means member on the photosensitive drum side are individually and rotatively supported by a cartridge frame while they are connected to each other. In such a case, the photosensitive drum and the coupling means member on the photosensitive drum side are supported so that they do not move relative to the cartridge frame.

Positioning of Process Cartridge in Terms of the Direction Substantially Perpendicular to the Axial Line of Photosensitive Drum Next, referring to FIGS. 28–36, the positioning of the process cartridge B in terms of the direction substantially perpendicular to the axial line of the photosensitive drum 7 will be described. In FIGS. 28–38, the U-shaped grooves 16b and 16d are not illustrated.

It should be noted here that the process cartridge referred to in the following embodiments are such process cartridges that comprises: an electrophotographic photosensitive drum; processing means which acts on the electrophotographic photosensitive drum; a cartridge frame which houses the electrophotographic photosensitive drum and the processing means; a coupling means member which engages with the coupling means member on the image forming apparatus's main assembly side as the process cartridge is installed in the main assembly of an image forming apparatus, and generates thrust in the direction to push the electrophotographic photosensitive drum or/and the cartridge frame in the lengthwise direction thereof as it receives rotational driving force from the coupling means member on the side of the main assembly of an image forming apparatus; and a process cartridge positioning member, which comes in contact with a process cartridge positioning member on the main assembly side of an image forming apparatus to fix the position of the process cartridge in terms of the direction perpendicular to the axial line of the electrophotographic photosensitive drum as the process cartridge is installed in the main assembly of an image forming apparatus.

In the following embodiments, as the rotational axes of the female type coupler shaft 39b and the male type coupler shaft 37 automatically align with each other, the process cartridge B is moved a certain distance in the downward direction substantially perpendicular to the axial line of the photosensitive drum 7. In order to regulate this movement of the process cartridge B so that the process cartridge B does not move more than a predetermined distance, in other words, in order to fix the position of the process cartridge B in terms of the direction perpendicular to the axial line thereof, the process cartridge B is provided with a boss 38a as the process cartridge positioning member on the process cartridge B side, the outer surface of which comes in contact with the positioning projection 50 of the guide member 16 to regulate the movement of process cartridge B in the aforementioned direction, as illustrated in FIGS. 28–36. Further, in case of these embodiments, the rotational axes of the coupling recess 39a and the coupling projection 37a may, or may not, perfectly align with each other just as, or before, the cartridge positioning projection 50 on the apparatus main assembly 14 side comes in contact with the cartridge positioning boss 38a on the cartridge side. It is obvious, however, that even when the two coupling portions 39a and 37a do not perfectly align, the amount of aligning error is in a range in which satisfactory image quality from a practical point of view can be obtained.

It should be also pointed out here that the contact between the cartridge positioning members 50 and 38a on the apparatus main assembly 14 side and the process cartridge B side, respectively, becomes more secure when they come in contact with each other before the rotational axes of the coupling recess 39a and the coupling projection 37a perfectly align with each other, than when they come in contact with each other just as the axes of the coupling recess 39a and the coupling projection 37a perfectly align with each other, because when the two positioning member 50 and 38a come in contact with each other before the perfect alignment between the axes of the coupling recess 39a and coupling projection 37a, the contact pressure between the two positioning members 50 and 38a becomes greater. As a result, the vibration of the process cartridge B is better controlled.

Next, referring to FIGS. 4, 10 and 37, another embodiment of the present invention will be described.

This embodiment relates to the positioning of the photosensitive drum 7 in terms of the radial direction of the photosensitive drum 7 when the process cartridge B is installed in the apparatus main assembly 14. In other words, it relates to how the process cartridge B is regulated so that it is prevented from moving in the downward direction substantially perpendicular to the axial line of the photosensitive drum 7, more than a predetermined distance.

Referring to FIGS. 4 and 37, the process cartridge B is provided with a positioning projection 12c5, which is located on the side plate of the cleaning chamber frame 13. Next, referring to FIGS. 10 and 37, the apparatus main assembly 14 is provided with a positioning projection 15f, which projects from the cartridge guide 16. As the process cartridge B is installed in the apparatus main assembly 14, the cylindrical guide 13aL on the nondriven side fits in the U-shaped groove 16b, and at the same time, the positioning projection 12c5 of the process cartridge B on the driven side makes contact with the positioning projection 15f of the installation guide 16R. The contact surface between the positioning projection 12c5 and the positioning projection 15f intersects with the direction in which the process cartridge B is inserted; two may intersect perpendicularly to each other. Further, this contact surface may be flat or curved.

As for the design of the coupling means, any one of those described above may be employed.

In the case of this embodiment, it is unnecessary for the boss 38a to be placed in contact with the U-shaped groove 16d (it may be placed in contact with the U-shaped groove).

As the female type coupler shaft 39b rotates, the positioning projection 12c5 of the process cartridge B makes contact with the positioning projection 15f of the installation guide 16, being prevented from moving farther.

According to this embodiment, the boss 38a has only to be guided by the guide 16. In other words, it is unnecessary for the boss 38a to function as a positioning agent. Therefore, the requirements for the external design of the bearing 38 decrease. In addition, the vibration of the process cartridge B is better controlled as described above.

It should be noted here that this embodiment is one of the examples in which the process cartridge B is moved in the downward direction substantially perpendicular to the axial line of the photosensitive drum 7 by the force generated while the rotational axes of the coupling recess 39a and the coupling projection 37a automatically align with each other. Therefore, according to this embodiment, the aforementioned boss 38a as the cartridge positioning member may be placed in contact with the U-shaped groove 16d instead of the provision of the positioning projection 12c5 and the positioning projection 15f. Also in this case, the vibration of the process cartridge B is well controlled.

Further, it is possible to devise the configuration of the U-shaped groove 16d so that the movement of the process cartridge B in the direction substantially perpendicular to the axial line of the photosensitive drum 7 more than a predetermined distance can be prevented by the U-shaped groove 16d.

In the above description, the direction in which the coupling recess 39a is twisted is opposite to the rotational direction of the gear as seen from the bottom of the coupling recess 39a looking toward the entrance.

The ratio of the twist of the coupling recess 39a is 1 deg. to 15 deg. per 1.0 mm in the axial direction.

The depth of the coupling recess 39a is approximately 4.0 mm, and the angle of the overall twist is approximately 30 deg.

Although the coupling means in the preceding embodiments comprised a twisted recess and a twisted polygonal prism, the coupling means may comprise a twisted recess and a normal polygonal prism. In the case of the latter, a normal trigonal prism, for example, fits into a twisted recess, and as the recess rotates, the trigonal prism makes contact with the internal surface of the recess by the base portion, whereby the position of the trigonal prism is fixed relative to the recess. This base portion of the trigonal prism is rendered relatively strong compared to the other portions, and therefore, the trigonal prism as the coupling projection does not deform in terms of overall shape. However, the edges of the trigonal prism, the adjacencies thereof, and/or the internal surface of the recess correspondent thereto, slightly deform as the edges and the adjacencies thereof bite into the internal wall of the hole, better stabilizing the state of the coupling between the projection and the recess.

As will be evident from the above description, the present invention is also applicable to a coupling means structure in which the coupling projection and the coupling recess are located on the apparatus main assembly side and the process cartridge side, respectively.

As described above, according to the present invention, the position of an electrophotographic photosensitive drum in terms of the direction substantially perpendicular to the axial line thereof is fixed by the contact between the process cartridge positioning member on the process cartridge side and the process cartridge positioning member on the apparatus main assembly side. Further, when a process cartridge is provided with a coupling means member which generates thrust while it is in engagement with the coupling means member on the main assembly of an image forming apparatus, the electrophotographic photosensitive drum can be positioned more precisely in terms of the axial direction thereof.

While the invention has been described with reference to the structures disclosed herein, it is not confined to the details set forth and this application is intended to cover such modifications or changes as may come within the purposes of the improvements or the scope of the following claims.

What is claimed is:

1. A process cartridge detachably mountable to a main assembly of an electrophotographic image forming apparatus, wherein said main assembly includes a motor, a main assembly side driving rotatable member for receiving driving force from said motor, a main assembly positioning member, a hole which is substantially coaxial with said driving rotatable member, and a process cartridge mounting portion for mounting said process cartridge, said process cartridge comprising:

an electrophotographic photosensitive drum;

process means actable on said photosensitive drum; and a plurality of engageable portions engageable to said hole, said engageable portions being provided at and supported by an end of said electrophotographic photosensitive drum, wherein, when said driving rotatable member rotates with said engageable portions engaged with said hole, a rotational driving force is transmitted from said driving rotatable member to said photosensitive drum through engagement between said hole and said engageable portions;

a stopper portion for abutting to the main assembly positioning member to stop a movement of said process cartridge beyond a predetermined distance in a direction substantially perpendicular to an axis of said photosensitive drum, when said process cartridge is mounted to the cartridge mounting portion, and said photosensitive drum receives the rotational driving force through said hole and said plurality of engageable portions.

2. A process cartridge according to claim 1, wherein said plurality of engageable portions is provided on a projection that has a substantially prism shape.

3. A process cartridge according to claim 2, wherein said prism shape is a substantially triangular prism shape.

4. A process cartridge according to claim 3, wherein said prism shape is twisted.

5. A process cartridge according to claim 2 or 3, wherein said projection is non-twisted.

6. A process cartridge according to claim 1, wherein said hole has a cross-section of a substantially polygonal shape.

7. A process cartridge according to claim 6, wherein said polygonal shape is a triangular shape.

8. A process cartridge according to claim 7, wherein said hole is twisted.

9. A process cartridge according to claim 4 or 8, wherein when said photosensitive drum receives the rotational driving force through said hole and said plurality of engageable portions, said plurality of engageable portions receives pulling force toward said hole.

10. A process cartridge according to claim 3 or 7, wherein when said photosensitive drum receives the rotational driving force through said hole and said plurality of engageable portions, a relative movement is imparted between said plurality of engageable portions and said hole to effect substantial alignment therebetween.

11. A process cartridge according to claim 1, 6 or 7, wherein said hole is non-twisted.

12. An apparatus according to claim 1, wherein said process means includes at least a charging member for charging said photosensitive drum, a developing member for developing a latent image formed on said photosensitive drum, and a cleaning member for removing toner remaining on said photosensitive drum.

13. A process cartridge according to claim 1, 4, or 8, wherein said movement of said process cartridge stopped by said stopper portion is downward movement.

14. A process cartridge according to claim 1, 4 or 8, wherein said movement of said process cartridge stopped by said stopper portion is upward movement.

15. A process cartridge according to claim 1, wherein said stopper portion is projected substantially in the same direction as an axis of said photosensitive drum from an outer surface of a cartridge frame of said process cartridge.

16. A process cartridge according to claim 1, wherein said main assembly positioning member is projected from a side wall of said cartridge mounting portion.

17. A process cartridge according to claim 1, wherein said stopper portion is a projected portion provided coaxially with said photosensitive drum in a cartridge frame of said process cartridge, and the main assembly positioning member is a supporting member for supporting said projected portion.

18. A process cartridge detachably mountable to a main assembly of an electrophotographic image forming apparatus, wherein said main assembly includes a motor, a main assembly side driving rotatable member for receiving driving force from said motor, a main assembly positioning member, and a plurality of engageable portions, said plurality of engageable portions being substantially coaxial with said driving rotatable member, said process cartridge comprising:

an electrophotographic photosensitive drum;

process means actable on said photosensitive drum; and a hole engageable with said engageable portions, said hole being provided at and supported by a longitudinal end of said photosensitive drum;

wherein, when said driving rotatable member rotates with said engageable portions engaged with said hole, a rotational driving force is transmitted from said driving rotatable member to said photosensitive drum through engagement between said hole and said engageable portions;

a stopper portion for abutting to the main assembly positioning member to stop a movement of said process cartridge beyond a predetermined distance in a direction substantially perpendicular to an axis of said photosensitive drum, when said process cartridge is mounted to the main assembly, and said photosensitive drum receives the rotational driving force through said hole and said engageable portions.

19. A process cartridge according to claim 18, wherein said plurality of engageable portions is provided on a projection that has a substantially prism shape.

20. A process cartridge according to claim 19, wherein said prism shape is a substantially triangular prism shape.

21. A process cartridge according to claim 20, wherein said prism shape is twisted.

22. A process cartridge according to claim 19 or 20, wherein said projection is non-twisted.

23. A process cartridge according to claim 18, wherein said hole has a cross-section of a substantially polygonal shape.

24. A process cartridge according to claim 23, wherein said polygonal shape is a triangular shape.

25. A process cartridge according to claim 24, wherein said hole is twisted.

26. A process cartridge according to claim 21 or 25, wherein when said photosensitive drum receives the rotational driving force through said hole and plurality of engageable portions, said plurality of engageable portions receives pulling force toward said hole.

27. A process cartridge according to claim 20 or 24, wherein when said photosensitive drum receives the rotational driving force through said hole and said plurality of engageable portions, a relative movement is imparted between said plurality of engageable portions and said hole to effect substantial alignment therebetween.

28. A process cartridge according to claim 18, 23 or 24, wherein said hole is non-twisted.

29. A process cartridge according to claim 18, wherein said process means includes at least a charging member for charging said photosensitive drum, a developing member for developing a latent image formed on said photosensitive drum, and a cleaning member for removing toner remaining on said photosensitive drum.

30. A process cartridge according to claim 18, 21 or 25, wherein said movement of said process cartridge stopped by said stopper portion is downward movement.

31. A process cartridge according to claim 18, 21 or 25, wherein said movement of said process cartridge stopped by said stopper portion is upward movement.

32. A process cartridge according to claim 18, wherein said stopper portion is projected substantially in the same direction as an axis of said photosensitive drum from an outer surface of a cartridge frame of said process cartridge.

33. A process cartridge according to claim 18, wherein said main assembly positioning member is projected from a side wall of a cartridge mounting portion.

34. A process cartridge according to claim 18, wherein said stopper portion is a projected portion provided coaxially with said photosensitive drum in a cartridge frame of said process cartridge, and the main assembly positioning member is a supporting member for supporting said projected portion.

35. A process cartridge detachably mountable to a main assembly of an electrophotographic image forming apparatus for forming an image on a recording material, said main assembly including a motor, a driving rotatable member for receiving driving force from said motor, a main assembly positioning member, and one of a recess having a non-circular cross-section and a plurality of engageable portions, said recess or plurality of engageable portions being substantially coaxial with a rotation axis of said driving rotatable member, said process cartridge comprising:

a rotatable electrophotographic photosensitive drum;

process means actable on said photosensitive drum; and the other of a recess having a non-circular cross-section and a plurality of engageable portions, provided at and supported by an end of said photosensitive drum, wherein said other of said recess and plurality of engageable portions of said photosensitive drum has such a dimension and configuration that it can take a first relative rotational position with respect to said one of said recess and plurality of engageable portions of said driving rotatable member in which relative rotational movement therebetween is permitted, and a second relative rotational position with respect to said one of said recess and plurality of engageable portions of said driving rotatable member in which relative rotational movement is prevented in one rotational direction;

a stopper portion for abutting to the main assembly positioning member to stop a movement of said process cartridge beyond a predetermined distance in a direction substantially perpendicular to an axis of said photosensitive drum, when said process cartridge is mounted to the main assembly, and said photosensitive drum receives the rotational driving force through said recess and said plurality of engageable portions.

36. A process cartridge according to claim 35, wherein said plurality of engageable portions is provided on a projection that has a substantially prism shape.

37. A process cartridge according to claim 36, wherein said prism shape is a substantially triangular prism shape.

38. A process cartridge according to claim 37, wherein said prism shape is twisted.

39. A process cartridge according to claim 36 or 37, wherein said projection is non-twisted.

40. A process cartridge according to claim 35, wherein said recess has a cross-section of a substantially polygonal shape.

41. A process cartridge according to claim 40, wherein said polygonal shape is a triangular shape.

42. A process cartridge according to claim 41, wherein said recess is twisted.

43. A process cartridge according to claim 38 or 42, wherein when said photosensitive drum receives the rotational driving force through said recess and said plurality of engageable portions, said plurality of engageable portions receives pulling force toward said recess.

44. A process cartridge according to claim 37 or 41, wherein when said photosensitive drum receives the rotational driving force through said recess and said plurality of engageable portions, a relative movement is imparted between said plurality of engageable portions and said recess to effect substantial alignment therebetween.

45. A process cartridge according to claim 35, 40 or 41, wherein said recess is non-twisted.

46. A process cartridge according to claim 35, wherein said process means includes at least a charging member for charging said photosensitive drum, a developing member for developing a latent image formed on said photosensitive drum, and a cleaning member for removing toner remaining on said photosensitive drum.

47. A process cartridge according to claim 35, 38 or 42, wherein said movement of said process cartridge stopped by said stopper portion is downward movement.

48. A process cartridge according to claim 35, 38 or 42, wherein said movement of said process cartridge stopped by said stopper portion is upward movement.

49. A process cartridge according to claim 35, wherein said stopper portion is projected substantially in the same direction as an axis of said photosensitive drum from an outer surface of a cartridge frame of said process cartridge.

50. A process cartridge according to claim 35, wherein said main assembly positioning member is projected from a side wall of a cartridge mounting portion.

51. A process cartridge according to claim 35, wherein said stopper portion is a projected portion provided coaxially with said photosensitive drum in a cartridge frame of said process cartridge, and the main assembly positioning member is a supporting member for supporting said projected portion.

52. An electrophotographic image forming apparatus for forming an image on a recording material, to which a process cartridge is detachably mountable, comprising:
 (a) a motor;
 (b) a main assembly driving rotatable member for receiving rotational driving force from said motor;
 (c) a main assembly positioning member;
 (d) a hole which is substantially coaxial with said driving rotatable member;
 (e) a mounting member for detachably mounting said process cartridge, which includes:
  an electrophotographic photosensitive drum;
  process means actable on said photosensitive drum; and
  a plurality of engageable portions engageable with said hole, said plurality of engageable portions being provided at and supported by an end of said photosensitive drum;
  wherein when said driving rotatable member rotates with said hole and said plurality of engageable portions engaged with each other, the rotational driving force is transmitted from said driving rotatable member to said photosensitive drum through engagement between said hole and said plurality of engageable portions;
 a stopper portion for abutting to the main assembly positioning member to stop a movement of said process cartridge beyond a predetermined distance in a direction substantially perpendicular to an axis of said photosensitive drum, when said process cartridge is mounted to the mounting member, and said photosensitive drum receives the rotational driving force through said hole and said plurality of engageable portions;
 said apparatus further comprising:
 (f) feeding means for feeding the recording material.

53. An electrophotographic image forming apparatus for forming an image on a recording material, to which a process cartridge is detachably mountable, comprising:
 (a) a motor;
 (b) a main assembly driving rotatable member for receiving rotational driving force from said motor;
 (c) a main assembly positioning member;
 (d) a plurality of engageable portions which is substantially coaxial with said driving rotatable member;
 (e) a mounting member for detachably mounting said process cartridge, which includes:
  an electrophotographic photosensitive drum;
  process means actable on said photosensitive drum; and
  a hole engageable with said plurality of engageable portions, said hole being provided at a longitudinal end of said photosensitive drum;
  wherein when said driving rotatable member rotates with said hole and said plurality of engageable portions engaged with each other, the rotational driving force is transmitted from said driving rotatable member to said photosensitive drum through engagement between said hole and said plurality of engageable portions;
 a stopper portion for abutting to the main assembly positioning member to stop a movement of said process cartridge beyond a predetermined distance in a direction substantially perpendicular to an axis of said photosensitive drum, when said process cartridge is mounted to the mounting member, and said photosensitive drum receives the rotational driving force through said hole and said plurality of engageable portions;
 said apparatus further comprising:
 (f) feeding means for feeding the recording material.

54. An electrophotographic image forming apparatus for forming an image on a recording material, to which a process cartridge is detachably mountable, comprising:
 (a) a motor;
 (b) a driving rotatable member for receiving rotational driving force from said motor;
 (c) a main assembly positioning member;
 (d) one of a recess having a non-circular cross-section and a plurality of engageable portions, being substantially coaxial with a rotation axis of said driving rotatable member;
 (e) a mounting member for mounting said process cartridge, which includes:
  a rotatable electrophotographic photosensitive drum;
  process means actable on said photosensitive drum; and the other of a recess having a non-circular cross-section and a plurality of engageable portions, provided at and supported by an end of said photosensitive drum, wherein said other of said recess and said plurality of engageable portions of said photosensitive drum has such a dimension and configuration that it can take a first relative rotational position with respect to said one of said recess and said plurality of engageable portions of said driving rotatable member in which relative rotational movement therebetween is permitted, and a second relative rotational position with respect to said one of said recess and said plurality of engageable portions of said driving rotatable member in which relative rotational movement is prevented in one rotational direction;

a stopper portion for abutting to the main assembly positioning member to stop a movement of said process cartridge beyond a predetermined distance in a direction substantially perpendicular to an axis of said photosensitive drum, when said process cartridge is mounted to the mounting member, and said photosensitive drum receives the rotational driving force through said recess and said plurality of engageable portions;

said apparatus further comprising:

(f) feeding means for feeding the recording material.

\* \* \* \* \*

UNITED STATES PATENT AND TRADEMARK OFFICE
CERTIFICATE OF CORRECTION

PATENT NO. : 6,169,866 B1
DATED : January 2, 2001
INVENTOR(S) : Kazushi Watanabe et al.

It is certified that error appears in the above-identified patent and that said Letters Patent is hereby corrected as shown below:

Column 1,
Line 12, "includes" should read -- include --; and
Line 62, "a" should read -- an --.

Column 2,
Line 47, "is" (second occurrence) should read -- of --.

Column 4,
Line 48, "a" should be deleted.

Column 6,
Line 46, "extend" should read -- extended --.

Column 7,
Line 50, "an" should read -- a --.

Column 8,
Line 22, "above described" should read -- above-described --; and
Line 44, "a" should be deleted.

Column 11,
Line 21, "above described" should read -- above-described --.

Column 13,
Line 20, "the female" should read -- a female --; and
Line 26, "fixed" should read -- fixed to --.

Column 14,
Line 58, "an" should read -- a --.

Column 15,
Line 21, "reference" should be deleted.

Column 16,
Line 28, "and" should read -- an --; and
Line 62, "Figure," should read -- figure, --.

UNITED STATES PATENT AND TRADEMARK OFFICE
CERTIFICATE OF CORRECTION

PATENT NO.   : 6,169,866 B1
DATED        : January 2, 2001
INVENTOR(S)  : Kazushi Watanabe et al.

It is certified that error appears in the above-identified patent and that said Letters Patent is hereby corrected as shown below:

Column 18,
Line 29, "reach" should read -- reached --.

Column 22,
Line 45, "generates" should read -- generate --.

Column 24,
Line 47, "aforementioned 36" should read -- aforementioned drum flange 36 --; and
Line 53, "(a)." should read -- $\alpha$. --.

Column 25,
Line 21, "is" should be deleted;
Line 33, "lengthwise" should read -- lengthwise direction --; and
Line 62, "arrow B)." should read -- arrow $\beta$). --.

Column 27,
Line 22, "comprises:" should read -- comprise: --; and
Line 26, "apparatus's" should read -- apparatus' --.

Column 30,
Line 14, "portions;" should read -- portions; and --.

Column 31,
Line 21, "and" should be deleted; and
Line 30, "portions;" should read -- potions; and --.

Column 32,
Line 36, "and" should be deleted; and
Line 51, "direction;" should read -- direction; and --.

Column 33,
Line 65, "drum;" should read -- drum, --.

UNITED STATES PATENT AND TRADEMARK OFFICE
CERTIFICATE OF CORRECTION

PATENT NO. : 6,169,866 B1
DATED : January 2, 2001
INVENTOR(S) : Kazushi Watanabe et al.

It is certified that error appears in the above-identified patent and that said Letters Patent is hereby corrected as shown below:

<u>Column 34,</u>
Line 5, "portions;" should read -- portions; and --;
Line 33, "drum;" should read -- drum, --; and
Line 34, "portions;" should read -- potions; and --.

Signed and Sealed this

Fifteenth Day of January, 2002

*Attest:*

JAMES E. ROGAN
*Attesting Officer*       *Director of the United States Patent and Trademark Office*